(12) United States Patent
Nonomura et al.

(10) Patent No.: US 6,993,133 B1
(45) Date of Patent: Jan. 31, 2006

(54) DATA RECORDING AND REPRODUCTION APPARATUS

(75) Inventors: Tomoyuki Nonomura, Osaka (JP); Mitsuhiro Inoue, Studio City, CA (US); Masataka Minami, Burbank, CA (US); Masayuki Kozuka, Arcadia, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/414,722

(22) Filed: Oct. 8, 1999

(30) Foreign Application Priority Data

Oct. 8, 1998   (JP)   ................................. 10-287085

(51) Int. Cl.
*H04L 9/00*   (2006.01)
*H04L 9/32*   (2006.01)
*G06F 11/30*  (2006.01)
*G06F 12/14*  (2006.01)

(52) U.S. Cl. ...................... 380/252; 713/176; 713/189; 713/193

(58) Field of Classification Search ................ 380/252; 713/176, 189, 193
See application file for complete search history.

(56) References Cited

U.S. PATENT DOCUMENTS

| | | | | |
|---|---|---|---|---|
| 5,224,087 A | * | 6/1993 | Maeda et al. | 369/53.12 |
| 5,379,345 A | * | 1/1995 | Greenberg | 455/2.01 |
| 5,848,155 A | * | 12/1998 | Cox | 382/191 |
| 5,912,972 A | * | 6/1999 | Barton | 713/176 |
| 6,061,793 A | * | 5/2000 | Tewfik et al. | 713/176 |
| 6,209,092 B1 | * | 3/2001 | Linnartz | 713/176 |

FOREIGN PATENT DOCUMENTS

| | | |
|---|---|---|
| EP | 0 661 819 | 7/1995 |
| EP | 0840507 A1 | 5/1998 |
| EP | 0903943 A2 | 3/1999 |
| EP | 0915620 A1 | 5/1999 |
| EP | 0 933 919 | 8/1999 |
| JP | 10-145732 | 5/1998 |
| JP | 11-32200 | 2/1999 |
| JP | 11-98479 | 4/1999 |
| JP | 11-144380 | 5/1999 |

OTHER PUBLICATIONS

Hartung and Girod: "Digital Watermarking of Raw and Compressed Video" Proceedings of the Spie, Spie, Bellingham, VA, US, vol. 2952, Oct. 7, 1996; pp. 205-213, XP002085796.

* cited by examiner

*Primary Examiner*—Gilberto Barron, Jr.
*Assistant Examiner*—Benjamin E. Lanier
(74) *Attorney, Agent, or Firm*—Wenderoth, Lind & Ponack, L.L.P.

(57) ABSTRACT

A data recording and reproduction apparatus is provided with a stream attribute decision means for deciding whether an audio data stream supplied from an outside source is compressed or not. A compression ID flag having a value according to the result of the compression decision is attached to the audio data stream, and the flag-attached audio data stream is written in a stream storage unit. Therefore, a watermark can be inserted in a compressed audio data stream after reading the compressed audio data stream from the stream storage unit, whereby the time required for writing the compressed audio data stream in the stream storage unit is reduced, and the quality of analog audio data obtained by reproducing the compressed audio data stream is prevented from being degraded.

32 Claims, 18 Drawing Sheets

Fig. 7

| value of Ity | meaning of Ity (apparatus type) |
|---|---|
| 0 | player with function of inserting watermark at reproduction |
| 1 | recorder with function of inserting watermark at reproduction |

DATA RECORDING AND REPRODUCTION APPARATUS

FIELD OF THE INVENTION

The present invention relates to data recording and reproduction apparatuses and, more particularly, to configurations for protecting the copyrights for audio data distributed on networks or audio data supplied in the form of packages.

BACKGROUND OF THE INVENTION

In recent years, various kinds of multimedia equipment have been developed, and various kinds of multimedia software such as game software and education software have been marketed. However, under existing circumstances, the copyrights for these software are not satisfactorily protected, and a large number of illegally copied software appear on the market.

With the spread of the Internet in recent years, "Electronic Commerce" (EC) is increasingly being used by users of personal computers (PC), in which the users can obtain their favorite audio data or the like by downloading the data from homepages, and paying for the data by settlement means like credit cards.

The spread of network distribution by EC saves the users the trouble of going to record stores and, therefore, the network distribution by EC has a possibility of greatly changing the current distribution system of music, especially CD marketing.

By the way, audio data obtained by downloading as described above is recorded in a portable recording medium such as a CD-R (Compact Disk Recordable), whereby the user can listen to it many times.

Therefore, if the user only once obtains audio data in a PC, irrespective of whether the audio data is obtained through the internet or from a music CD on the market, the user can freely copy the audio data by using a CD-R. In other words, the copyright for the audio data stored in the PC cannot be effectively protected. Accordingly, in order to prevent audio data which has once been obtained by downloading from being copied and transferred to another user, i.e., to prevent illegal copying, it is very important to protect the copyright in the network distribution of the audio data.

Hereinafter, downloading and reproduction of audio data by using a PC will be described.

FIG. 11 is a block diagram illustrating the structure of a PC which performs downloading of audio data and reproduction of the downloaded audio data. The PC performs recording and reproduction of audio data which has been downloaded through a network, and the PC is hereinafter referred to as a "data recording and reproduction apparatus".

The data recording and reproduction apparatus 1000 includes a recording medium 1002 in which a compressed audio data stream is recorded as the above-described audio data, a stream writing means 1001 for writing a compressed audio data stream ESau downloaded through a network 10a into the recording medium 1002, and a stream reading means 1003 for reading the compressed audio data stream ESau from the recording medium 1002.

Further, the data recording and reproduction apparatus 1000 includes a decoding means 1004 for decompressing, by decoding, the compressed audio data stream ESau output from the stream reading means 1003 so as to output a non-compressed data stream RSau; and a DA conversion means 1005 for performing digital-to-analog (DA) conversion on the non-compressed audio data stream RSau to output analog audio data Aau to a speaker 20.

In the data recording and reproduction apparatus 1000 so constructed, when the compressed audio data stream ESau is downloaded through the network 10a, the compressed audio data stream ESau is once written in the recording medium 1002, such as a hard disk, by the stream writing means 1001.

When the audio data is reproduced in the data recording and reproduction apparatus 1000, the compressed audio data stream ESau is read from the recording medium 1003 by the stream reading means 1003. Further, the compressed audio data stream ESau is decompressed by decoding in the decoding means 1004, whereby a non-compressed audio data stream RSau is restored therefor.

The non-compressed audio data stream RSau is converted to analog audio data Aau by the DA conversion means 1005 to be output to the speaker 20.

As described above, in the data recording and reproduction apparatus 1000 implemented by a PC, the audio data distributed on the network 10a can be easily and illegally copied by recording the compressed audio data stream Esau, which has been downloaded through the network 10a, in the recording medium 1002.

Meanwhile, MD (Mini Disc) players have become available as recording and reproduction apparatuses capable of recording digital audio data recorded on recording media such as CDs.

FIG. 12 is a block diagram illustrating the structure of an MD player.

This MD player 1100 includes a recording medium 1103 in which digital audio data is recorded, a coding means 1101 for compressing, by coding, a non-compressed audio data stream Sau read from a CD 10b to output a compressed audio data stream Esau, and a stream writing means 1102 for writing the compressed audio data stream ESau in the recording medium 1103 as the above-described digital audio data.

Further, the MD player 1100 includes a stream reading means 1104 for reading the compressed audio data stream ESau from the recording medium 1103, a decoding means 1105 for decompressing the read compressed audio data stream ESau by decoding to output a non-compressed audio data stream RSau, and a DA conversion means 1106 for performing DA conversion on the non-compressed audio data stream RSau to output analog audio data Aau to a speaker 20.

In the MD player 1100 so constructed, when the digital audio data (the non-compressed audio data stream) Sau obtained from the CD 10b is input, the non-compressed audio data stream Sau is compressed by coding in the coding means 1101 to be output as the compressed audio data stream ESau. The compressed audio data stream ESau is once written in the MD 1103 by the stream writing means 1102.

When the audio data is reproduced in the MD player 1100, the compressed audio data stream ESau is read from the recording medium 1103 by the stream reading means 1104, and the compressed audio data stream ESau is decompressed by decoding in the decoding means 1105 to be output as a non-compressed audio data stream RSau.

The non-compressed audio data stream RSau is converted to analog audio data Aau by the DA conversion means 1005 to be output to the speaker 20.

In the MD player as described above, the digital audio data recorded in the CD can be easily and illegally copied by digital-recording the audio data in the MD.

Furthermore, according to a recent trend in this technology, there is a demand for a recording and reproduction apparatus such as an MD player which is able to download audio data from home pages on the internet, and a data recording and reproduction apparatus meeting this demand has been developed.

FIG. 13 is a block diagram for explaining a data recording and reproduction apparatus which is able to obtain audio data from both a home page and a CD and to reproduce the obtained audio data.

This data recording and reproduction apparatus 1200 includes a recording medium 1204 containing a compressed audio data stream, and a stream attribute decision means 1201 for deciding whether the input audio data stream is compressed or not. Usually, the audio data stream downloaded through the network 10a is compressed while the audio data stream read from the CD 10b is not compressed.

Further, the data recording and reproduction apparatus 1200 includes a coding means 1202 for compressing, by coding, the non-compressed audio data stream Sau output from the stream attribute decision means 1201 to output a compressed audio data stream ESau; and a stream writing means 1203 for writing the compressed audio data stream ESau which is output from the coding means 1202 and the non-compressed audio data stream DSau which is output from the stream attribute decision means 1201 into the recording medium 1204.

Further, the data recording and reproduction apparatus 1200 includes a stream reading means 1205 for reading the compressed audio data stream ESau from the recording medium 1204, a decoding means 1206 for decompressing, by decoding, the read compressed audio data stream ESau to output a non-compressed audio data stream RSau, and a DA conversion means 1207 for performing DA conversion of the non-compressed audio data stream RSau to output analog audio data Aau to the speaker 20.

In the data recording and reproduction apparatus 1200 so constructed, when an audio data stream is input, the stream attribute decision means 1201 decides whether this audio data stream is compressed or not. According to the result of the decision, the audio data stream is output to one of the stream writing means 1203 and the coding means 1202. For example, when the compressed audio data stream ESau is input through the network 10a, this compressed audio data stream ESau is output to the stream writing means 1203 according to the decision of the stream attribute decision means 1201. On the other hand, when the non-compressed audio data stream Sau obtained from the CD 10b is input, this non-compressed audio data stream Sau is output to the coding means 1202 according to the decision of the stream attribute decision means 1201.

The compressed audio data stream ESau is once written in the recording medium 1204 by the stream writing means 1203.

When the audio data is reproduced in the data recording and reproduction apparatus 1200, the compressed audio data stream ESau is read from the recording medium 1204 by the stream reading means 1205. This compressed audio data stream ESau is decompressed by decoding in the decoding means 1206 to be output as a non-compressed audio data stream RSau.

Thereafter, the non-compressed audio data stream RSau is converted to analog audio data Aau by the DA conversion means 1207 to be output to the speaker 20.

In the data recording and reproduction apparatus shown in FIG. 13, illegal copying of audio data for which the copyright is to be protected becomes easier and, therefore, preventing such illegal copying of audio data is of greater importance.

By the way, as a countermeasure against illegal copying of audio data, there is a method of inserting a watermark in audio data for which the copyright is to be protected.

This watermark is inserted in digital audio data. Further, the watermark-inserted digital audio data is converted to analog audio data. Regardless of whether the analog audio data obtained by DA conversion of the watermark-inserted digital audio data remains as it is or whether the analog audio data is converted to digital data, the watermark can be extracted from the analog data or the digital data.

Hereinafter, a description will be given of the general principle of watermark insertion and extraction.

Initially, the outline of a process of inserting a watermark in digital audio data will be described.

FIG. 14 is a diagram conceptually illustrating an insertion and extraction of a watermark in/from digital audio data.

With reference to FIG. 14, signature data (watermark) is inserted in digital audio data recorded as an audio data file ODau (signature data insertion step Pad), and then the digital audio data in which the signature data is inserted is recorded as a signature-data-inserted audio data file SDau.

The signature data Dwmx inserted in the digital audio data is extracted in accordance with the digital audio data recorded as the audio data file ODau and the digital audio data recorded as the signature-data-inserted audio data file SDau.

FIG. 15 is a flowchart of the watermark insertion process.

Initially, digital audio data is subjected to blocking (step S1). This process is to divide the digital audio data into a plurality of data groups (blocks) each comprising a predetermined number of sampling data as a matter of convenience in the subsequent process.

Next, each block is subjected to the Fourier transform (step S2). The arithmetic operation for the Fourier transform will be described later in detail.

Thereafter, the following data transform is carried out as the watermark insertion process.

The watermark is composed of multiple bits of digital data (signature data), and each bit of the signature data corresponds to each block.

Initially, it is confirmed that the value of each bit as a component of a bit string (block string) of the signature data is "0" or "1" (step S3). A block corresponding to a bit of "0" is not subjected to watermarking. On the other hand, a block corresponding to a bit of "1" is subjected to watermarking, wherein an imaginary number part and a real number part of Fourier transform coefficients of audio data corresponding to this block are replaced with each other, and the real number part is multiplied with −1 (step S4). This process is performed for each block corresponding to a bit of "1".

Then, each block, irrespective of whether the block corresponds to "0" or "1" is subjected to the inverse Fourier transform (step S5). Thereby, audio data of each block is restored. The inverse Fourier transform will be described later in more detail.

Through the above-described processes, a watermark which is inaudible to a normal human ear is inserted in the audio data.

Hereinafter, the respective processes will be described in more detail.

Initially, the Fourier transform and the inverse Fourier transform will be briefly described. The Fourier transform employed in the process of embedding a watermark (information to be embedded) is called "discrete Fourier transform" and is defined as follows.

When a discrete one-dimensional real number function f(n) (n∈Z,0≦n≦N) is given, a function obtained by performing the discrete Fourier transform on the discrete one-dimensional real number function f(n) is defined by a discrete one-dimensional complex number function F(k) (k∈Z,0≦k<N) which is given by formula (1) identified below.

Here, Z denotes the set of whole integers. Further, formula (1) satisfies the conditions given by formulae (2) and (3).

$$F(k) = \sum_{n=0}^{N-1} f(n) W_N^{-kn} \quad (k = 0, 1, \cdots N-1) \quad (1)$$

$$j^2 = -1 \quad (2)$$

$$W_N = e^{j2\pi/N} = \cos(2\pi/N) + j\sin(2\pi/N) \quad (3)$$

Further, the inverse discrete Fourier transform will be described hereinafter.

When a discrete one-dimensional real number function f(n) (n∈Z,0≦n<N) is given and a discrete one-dimensional complex number function F(k) (k∈Z,0≦k<N) is a function obtained by performing the discrete Fourier transform on the f(n), the following formula (4) holds.

Here, Z denotes the set of whole integers. Further, formula (4) satisfies the conditions given by formulae (5) and (6).

$$F(k) = \sum_{n=0}^{N-1} f(n) W_N^{-kn} \quad (k = 0, 1, \ldots N-1) \quad (1)$$

$$j^2 = -1 \quad (5)$$

$$W_N = e^{j2\pi/N} = \cos(2\pi/N) + j\sin(2\pi/N) \quad (6)$$

Next, the watermark embedding process for audio data will be described more specifically.

First of all, blocking of audio data will be described with reference to FIG. 16.

Blocking is a process to represent sample values Sound(i) of digital audio data in which a watermark is to be embedded (hereinafter, referred to as target audio data) as a set of blocks each comprising samples which may number as many as the n-th power of 2 ($2^n$). Here, it is assumed that the total number of blocks obtained by blocking the target audio data is (t+1), the first block is block $B_0$, the k-th block (K is an arbitrary number) is block $B_k$, and the last block is block $B_t$. Further, the sample values of the k-th block are represented by $B_k(j)$.

The relationship between the sample values Sound(i) of the target audio data and the respective sample values $B_k(j)$ in the block is represented by the following formula (7).

$$B_k(j) = \text{Sound}(i) \quad (7)$$

where Z denotes the set of whole integers, k and j satisfy k,j∈Z, and i satisfies $i = 2^n k + j$ ($0 \leq j < 2^n$).

Needless to say, the variables n and k used here are different from the variables n and k used in formula (1), which defines the general discrete one-dimensional Fourier transform, and in formula (4), which defines the discrete one-dimensional inverse Fourier transform.

Next, the watermark embedding process will be described.

Initially, the audio data (sample values) $B_k(j)$ of the k-th block $B_k$ are subjected to the discrete Fourier transform so as to obtain data $F_k(m)$. Here, k is a variable indicating an arbitrary block amongst the blocks $B_o$–$B_t$, and it satisfies k∈Z, k∈[0,t(total block number)].

Further, a data bit string to be inserted is defined by a one-dimensional discrete integral number function U(d), and data which is obtained by embedding information in the data $F_k(m)$ (m∈Z, m∈$[1,2^n]$) according to the value of each bit in the data bit string defined by the function U(d) is represented by $F'_k(m)$.

Here, d and $d_n$ satisfy the condition (d, $d_n$∈Z). When $d_n$ satisfies $d_n < 2^{n-1}$, U(d) is 1 or 0. When d does not satisfy d∈$[1,d_n]$), U(d) is 0.

Then, $F'_k(m)$ is represented by the following formulae (8)–(15), wherein m satisfies m∈Z, m∈$[1,2^n]$.

$$Re(F'_k(m)) = -Im(F_k(m)) \text{ (when } U(m)=1) \quad (8)$$

$$Re(F'_k(m)) = Re(F_k(m)) \text{ (when } U(m)=0) \quad (9)$$

$$Im(F'_k(m)) = Re(F_k(m)) \text{ (when } U(m)=1) \quad (10)$$

$$Im(F'_k(m)) = Im(F_k(m)) \text{ (when } U(m)=0) \quad (11)$$

$$Re(F'_k(2^n-m+1)) = Im(F_k(m)) \text{ (when } U(m)=1) \quad (12)$$

$$Re(F'_k(2^n-m+1)) = Re(F_k(m)) \text{ (when } U(m)=0) \quad (13)$$

$$Im(F'_k(2^n-m+1)) = Re(F_k(m)) \text{ (when } U(m)=1) \quad (14)$$

$$Im(F'_k(2^n-m+1)) = Im(F_k(m)) \text{ (when } U(m)=0) \quad (15)$$

The above-described formulae (8)–(11) are applied to the low-frequency components amongst the $2^n$ pieces of data (frequency components) $F_k(m)$ obtained by subjecting the $2^n$ pieces of data (sample values) $B_k(j)$ to the discrete Fourier transform. On the other hand, the above-described formulae (12)–(15) are applied to the high-frequency components of the $2^n$ pieces of data (frequency components) $F_k(m)$ obtained by subjecting the $2^n$ pieces of data (sample values) $B_k(j)$ to the discrete Fourier transform.

Further, as represented by formulae (9), (11), (13) and (15), a block corresponding to a bit of 0 in the signature data bit string is not subjected to the watermark embedding process. On the other hand, as represented by formulae (8), (10), (12) and (14), a block corresponding to a bit of 1 in the signature data bit string is subjected to the watermark embedding process, in which the imaginary number part and the real number part of the data $F_k(m)$ obtained by the Fourier transform of the audio data (sample values) $B_k(j)$ corresponding to this block are replaced with each other, and the real number part is multiplied with −1.

Further, the watermark embedding process is performed on pairs of the Fourier transformed data on the low-frequency side and the corresponding Fourier transformed data on the high-frequency side so that the target audio data in which information is embedded is not offensive to the ear of the listener. Here, the m-th Fourier transformed data $F'_k(m)$ which has been subjected to the watermark embedding process corresponds to the $(2^n-m+1)$th Fourier transformed data $F'k(2^n-m+1)$ which has been subjected to the watermark embedding process.

Next, the watermark extraction process will be described.

FIG. 17 is a flowchart of the watermark extraction process.

Initially, audio data which has been subjected to the watermark embedding process is divided into plural blocks (step S11a), and each of the plural blocks of the audio data subjected to the watermark embedding process is subjected to the Fourier transform (step S12a). Further, audio data which has not been subjected to the watermark embedding process is divided into plural blocks (step S11b), and of the plural blocks of the audio data which has not been subjected to the watermark embedding process each is subjected to the Fourier transform (step S12b).

Then, the data obtained as the results of the above-described Fourier transform steps are compared, block by block, between the blocks of the audio data which have been subjected to the watermark embedding process and the corresponding blocks of the audio data which have not been subjected to the watermark embedding process (step S13).

As a result of the comparison, when the data of the corresponding blocks are the same as each other, it is decided that no watermark is embedded in the block which has been subjected to the watermark embedding process, and the signature data bit is 0 (step S14). However, when the data of the corresponding blocks are different from each other, it is decided that a watermark is embedded in the block which has been subjected to the watermark embedding process, and the signature data bit is 1 (Step S15).

This process is repeated block by block to extract the bit string (embedded information) constituting the signature data.

Next, the watermark embedding process and the watermark extracting process will be described more specifically.

Initially, the process of embedding a watermark in each block will be described.

In the following description, Sound(n) represents audio data (sample values) in one block in which signature data is to be embedded, and syomei[u] represents a signature data bit string to be embedded in data which is obtained by subjecting the audio data Sound(n) in one block to the Fourier transform. Further, F[Sound](p) represents data obtained by subjecting the target audio data Sound(n) to the discrete Fourier transform, and F'[Sound](p) represents data obtained by embedding the signature data bit string in the F[Sound](p).

Here, the audio data Sound(n) is a function defined in the integral space and has an integer as its value, where n=0,1, ... ,N.

Further, the signature data bit string syomei[u] is also a function defined in the integral space (refer to formula (16)) but has only 0 or 1 as its value, where u=0,1.

$$syomei[u] = \{1, 0\} \tag{16}$$

When the audio data Sound(n) is subjected to the Fourier transform, the corresponding Fourier transformed data F[Sound](p) is obtained as follows.

$$F[Sound](p) = \sum_{n=0}^{N} Sound(n) e^{j2\pi pn/N} \tag{17}$$

This F[Sound](p) is a function defined in the integral space and has a complex number as its value, where p=0,1, ... N.

Assuming that the real number part of the Fourier transformed data F[Sound](p), which is a complex number, is Re{F[Sound](p)} while the imaginary number part thereof is Im{F[Sound](p)}, the data F'[Sound](p) can be represented by using the above-described formulae (8)–(15) in accordance with the value of the signature data bit string syomei[u].

Assuming that the signature data bit string to be embedded in the Fourier transformed data F[Sound](p) corresponding to one block is syomei[0]=1, the first bit value F[Sound](1) of the Fourier transformed data F[Sound](p) and the N-th bit value F[Sound](N) thereof are subjected to the information embedding process by using the above-described formulae (8), (10), (12) and (14).

The following formulae (18)–(21) represent the Fourier transformed data F'[Sound](1) and F'[Sound](N) obtained in the watermark embedding process.

$$Re\{F'[Sound](1)\} = -Im\{F[Sound](1)\} \tag{18}$$

$$Im\{F'[Sound](1)\} = Re\{F[Sound](1)\} \tag{19}$$

$$Re\{F'[Sound](N)\} = -Im\{F[Sound](N)\} \tag{20}$$

$$Im\{F'[Sound](N)\} = Re\{F[Sound](N)\} \tag{21}$$

where Re and Im indicate the real number part and the imaginary number part of the complex number in { }, respectively.

On the other hand, assuming that the signature data bit string to be embedded in the audio data Sound(n) corresponding to one block is syomei[1]=0, the second bit value F[Sound](2) of the Fourier transformed data F[Sound](p) and the (N−1)th bit value F[Sound](N−1) thereof are subjected to the watermark embedding process by using the above-described formulae (9), (11), (13) and (15).

The following formulae (22)–(25) represent the Fourier transformed data F'[Sound](2) and F'[Sound](N−1) obtained in the watermark embedding process.

$$Re\{F'[Sound](2)\} = Re\{F[Sound](2)\} \tag{22}$$

$$Im\{F'[Sound](2)\} = Im\{F[Sound](2)\} \tag{23}$$

$$Re\{F'[Sound](N-1)\} = Re\{F[Sound](N-1)\} \tag{24}$$

$$Im\{F'[Sound](N-1)\} = Im\{F[Sound](N-1)\} \tag{25}$$

By performing the inverse discrete Fourier transform on the data F'[Sound](p) which has been obtained by subjecting the Fourier transformed data F[Sound](p) corresponding to the audio data Sound(n) in one block to the watermark embedding process by using the above-described formulae (8)–(15), watermark-embedded audio data Sound'(n) is obtained as represented by the following formula (26).

$$Sound'(n) = \sum_{n=0}^{N} F'[Sound](p) e^{j2\pi pn/N} \tag{26}$$

Next, the watermark extraction process will be described briefly.

In the watermark extraction process, the Sound(n) and the Sound'(n) are respectively subjected to the Fourier transform, and the respective Fourier-transformed data are compared. When the values of these data are different from each other, the signature data bit string is extracted with the signature bit data being 1. When the values of these data are identical, the signature data bit string is extracted with the signature bit data being 0.

The algorithm for the watermark extraction process will now be briefly described.

In { }, n moves sequentially from 1 to N.
{
   If F[Sound](n)=F[Sound'](n) does not hold, syomei[n−1]
     =0
   If F[Sound](n)=F[Sound'](n) holds, syomei[n−1]=0
}

By the way, in the existing reproduction apparatuses such as MD players which do not detect watermarks, audio data streams in which watermarks are embedded as described above can be recorded and reproduced similar to the way audio data streams in which no watermark is embedded can be recorded and reproduced.

If reproduction apparatuses such as MD players which will be manufactured in the future are only those which do not record audio data streams in which watermarks of "copy inhibit" are embedded but which also can record audio data streams in which no watermark of "copy inhibit" is embedded, it is possible to restrict illegal copying to the audio data streams by watermarking in the future.

However, since watermarks are embedded in non-compressed audio data streams, it is difficult to simply apply the above-described watermark embedding process to the data recording and reproduction apparatus 1200 which receives compressed audio data streams from the homepage and non-compressed audio data streams from the CD.

Consequently, in the data recording and reproduction apparatus 1200 which can obtain audio data from both the homepage and the CD and reproduce the audio data, illegal copying of the audio data cannot be effectively prevented by using watermarking.

SUMMARY OF THE INVENTION

The present invention is made to solve the above-described problems, and its object is to provide a data recording and reproduction apparatus which can record and reproduce audio data regardless of its form when the audio data is supplied (i.e., either a non-compressed audio data stream or a compressed audio data stream), and to satisfactorily protect the copyright for the audio data by embedding watermarks in these audio data streams, thereby effectively preventing illegal copying of the audio data.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided a data recording and reproduction apparatus for recording and reproducing an audio data stream as digital audio data. The apparatus according to the first aspect comprises a stream storage unit for storing the audio data stream, a stream writing unit for writing the audio data stream into the stream storage unit, and a stream reading unit for reading the audio data stream from the stream storage unit. The stream writing unit includes stream attribute decision means for deciding whether or not the audio data stream has been subjected to a data conversion process for creating digital audio data, and stream writing means for attaching a conversion ID flag having a value according to the result of the decision to the audio data stream, and for writing the flag-attached audio data stream into the stream storage unit. The stream reading unit includes stream reading means for reading the flag-attached audio data stream from the stream storage unit, and watermarking means for inserting a watermark in the read audio data stream. In the apparatus so constructed, the read audio data stream in which the watermark is to be inserted is subjected to an inverse conversion process of the data conversion process according to the value of the conversion ID flag attached to the audio data stream. Therefore, a watermark can be inserted in the audio data stream when the audio data stream is read from the stream storage unit instead of when the audio data stream is recorded in the stream storage unit. Thereby, this apparatus can dispense with both the inverse conversion process of the data conversion process, which is required in the case where a watermark is inserted in a converted audio data stream when the audio data stream is recorded in the stream storage unit, and the subsequent data conversion process, and therefore the quality of the reproduced audio data stream is prevented from being degraded and the recording time is thereby reduced.

According to a second aspect of the present invention, in accordance with the data recording and reproduction apparatus of the first aspect, the stream reading unit has DA conversion means for converting the audio data stream in which the watermark is inserted by the watermarking means from digital to analog audio data, and for outputting the analog audio data. Therefore, the analog audio data can be protected by the watermark, and the quality of the reproduced analog audio data stream is prevented from being degraded, and moreover, the recording time is thereby reduced.

According to a third aspect of the present invention, in accordance with the data recording and reproduction apparatus of the first aspect, the data conversion process performed on the digital audio data is a compression process for compressing the digital audio data by coding, and the inverse conversion process is a decompression process for decompressing the compressed digital audio data by decoding. The stream writing means attaches a composition ID flag to the audio data stream as the conversion ID flag having a value according to the result of the decision of the stream attribute decision means. The composition ID flag indicates whether or not the audio data stream has been subjected to the digital audio data compression process. Therefore, this apparatus can dispense with both the decoding process, which is required in the case where a watermark is inserted in a compressed (coded) audio data stream when the stream is recorded in the stream storage unit, and the subsequent compression process, and therefore, the quality of the reproduced audio data stream is prevented from being degraded, and the recording time is thereby reduced.

According to a fourth aspect of the present invention, in accordance with the data recording and reproduction apparatus of the third aspect, the stream reading unit further includes stream flag decision means for deciding whether or not the audio data stream read from the stream storage unit has been subjected to the compression process according to the compression ID flag of the read audio data stream, and decoding means for decompressing, by decoding, the audio data stream which is decided as being subjected to the compression process by the stream flag decision means. The audio data stream which is decided as being not subjected to the compression process by the stream flag decision means and the decompressed audio data stream output from the decoding means are supplied to the watermarking means. Therefore, in the stream reading unit, only the compressed audio data streams among the audio data streams read from the stream storage unit can be selectively decompressed by decoding.

According to a fifth aspect of the present invention, in accordance with the data recording and reproduction apparatus of the third aspect, the stream reading unit has DA conversion means for converting the audio data stream in which the watermark is inserted by the watermarking means to analog audio data, and for outputting the analog audio data. Therefore, the analog audio data can be protected by the watermark, and the quality of the reproduced analog audio data stream is prevented from being degraded, and moreover, the recording time can be thereby reduced.

According to a sixth aspect of the present invention, in accordance with the data recording and reproduction apparatus of the first aspect, the data conversion process performed on the digital audio data includes at least one of a compression process for compressing digital audio data by coding and an audio data scramble process for scrambling digital audio data or compressed digital audio data. The inverse conversion process includes at least one of a decompression process for decompressing compressed digital audio data by decoding and a descramble process for descrambling scrambled digital audio data or scrambled compressed digital audio data. The stream writing means attaches a compression ID flag and a scramble ID flag to the audio data stream as the conversion ID flag having a value corresponding to the result of the decision. The compression ID flag indicates whether or not the audio data stream has been subjected to the digital audio data compression process, and the scramble ID flag indicates whether or not the audio data stream or the compressed audio data stream has been subjected to the audio data scramble process. Therefore, this apparatus can dispense with the descrambling process and the decoding process which are required in the case where a watermark is inserted in a compressed (coded) audio data stream when the stream is recorded in the stream storage unit, and the subsequent compression process, and therefore the quality of the reproduced audio data stream is prevented from being degraded, and the recording time is thereby reduced.

According to a seventh aspect of the present invention, in accordance with the data recording and reproduction apparatus of the sixth embodiment, the stream writing unit further includes scramble key writing means for writing a scramble key adapted to the audio data stream which has been subjected to the scramble process into the stream storage unit. The stream reading unit further includes: scramble key reading means for reading the scramble key adapted to the audio data stream which has been subjected to the scramble process from the stream storage unit; first stream flag decision means for deciding whether or not the audio data stream read from the stream storage unit has been subjected to the scramble process according to the scramble ID flag of the read audio data stream; descrambling means for descrambling by using the scramble key, the audio data stream which is decided as being scrambled by the first stream flag decision means, second stream flag decision means for deciding whether or not the audio data stream which is decided as being not scrambled by the first stream flag decision means and the descrambled audio data stream output from the descrambling means have been subjected to the compression process according to the compression ID flags of these audio data streams; and decoding means for decompressing, by decoding, the audio data stream which is decided as being compressed by the second stream flag decision means. In the apparatus so constructed, the audio data stream which is decided as being not scrambled by the first stream flag decision means and the descrambled audio data stream output from the descrambling means are supplied to the second stream flag decision means. The audio data stream which is decided as being not compressed by the second stream flag decision means and the decompressed audio data stream output from the decoding means are supplied to the watermarking means. Therefore, in the stream reading unit, only the scrambled audio data streams among the audio data streams read from the stream storage unit can be selectively descrambled, and only the compressed audio data streams can be selectively decompressed by decoding.

According to an eighth aspect of the present invention, in accordance with the data recording and reproduction apparatus of the fifth aspect, the stream reading unit has DA conversion means for converting the audio data stream in which the watermark is inserted by the watermarking means from digital audio data to analog audio data, and the DA conversion means outputs the analog audio data. Therefore, the analog audio data can be protected by the watermark, and the quality of the reproduced analog audio data stream is prevented from being degraded, and moreover, the recording time is thereby reduced.

According to a ninth aspect of the present invention, in accordance with the data recording and reproduction apparatus of the first aspect, the stream reading unit is constituted by a single apparatus for reproducing a data stream, and this data stream reproduction apparatus includes means for holding apparatus type information which indicates the type of this apparatus. The stream storage unit includes: stream storage means for storing the audio data stream output from the stream writing unit; authorized apparatus type information storage means for storing authorized apparatus type information indicating stream reproduction apparatuses which are permitted to read the audio data stream from the stream storage means; apparatus type information obtaining means for obtaining the apparatus type information held by the apparatus type information holding means; and stream read permission decision means for searching the authorized apparatus type information storage means for the apparatus type information obtained by the apparatus type information obtaining means, and for permitting the stream reading unit to read the audio data stream from the stream storage unit only when an authorized apparatus type information corresponding to the obtained apparatus type information is present. Therefore, this apparatus can prevent the audio data stream stored in the stream storage unit from being undesirably read by an audio data recording and reproduction apparatus having no watermarking means, and thus, the read audio data stream cannot be reproduced or copied without being subjected to watermarking.

According to a tenth aspect of the present invention, in accordance with the data recording and reproduction apparatus of the fourth aspect, the stream reading unit is constituted by a single apparatus for reproducing a data stream, and this data stream reproduction apparatus has means for holding apparatus type information indicating the type of this apparatus. The stream storage unit includes: stream storage means for storing the audio data stream output from the stream writing means; authorized apparatus type information storage means for storing authorized apparatus type information indicating stream reproduction apparatuses which are permitted to read the audio data stream from the stream storage means; apparatus type information obtaining means for obtaining the apparatus type information held by the apparatus type information holding means; and stream read permission decision means for searching the authorized apparatus type information storage means for the apparatus type information obtained by the apparatus type information obtaining means, and for permitting the stream reading unit to read the audio data stream from the stream storage unit only when an authorized apparatus type information corresponding to the obtained apparatus type information is present. Therefore, this apparatus can prevent the audio data stream stored in the stream storage unit from being undesirably read by an audio data recording and reproduction apparatus having no watermarking means, and thus, the read audio data stream cannot be reproduced or copied without being subjected to watermarking.

According to an eleventh aspect of the present invention, in accordance with the data recording and reproduction apparatus of the seventh aspect, the stream reading unit is constituted by a single apparatus for reproducing a data stream, and this data stream reproduction apparatus has means for holding apparatus type information indicating the type of this apparatus. The stream storage unit includes: stream storage means for storing the audio data stream output from the stream writing unit; scramble key storage means for storing the scramble key output from the stream writing means; authorized apparatus type information storage means for storing authorized apparatus type information indicating stream reproduction apparatuses which are permitted to read the audio data stream from the stream storage means; apparatus type information obtaining means for obtaining the apparatus type information held by the apparatus type information holding means; and stream read permission decision means for searching the authorized apparatus type information storage means for the apparatus type information obtained by the apparatus type information obtaining means, and for permitting the stream reading unit to read the audio data stream from the stream storage means only when an authorized apparatus type information corresponding to the obtained apparatus type information is present. Therefore, this apparatus can prevent the audio data stream stored in the stream storage unit from being undesirably read by an audio data recording and reproduction apparatus having no watermarking means, and thus, the read audio data stream cannot be reproduced or copied without being subjected to watermarking.

According to a twelfth aspect of the present invention, in accordance with the data recording and reproduction apparatus of the seventh aspect, the stream reading unit is constituted by a single apparatus for reproducing a data stream, and this data stream reproduction apparatus has means for holding apparatus type information indicating the type of this apparatus. The stream storage unit includes: stream storage means for storing the audio data stream output from the stream writing unit; scramble key storage means for storing the scramble key output from the stream writing unit; authorized apparatus type information storage means for holding authorized apparatus type information indicating stream reproduction apparatuses which are authorized to read the audio data stream from the stream storage means; apparatus type information obtaining means for obtaining the apparatus type information held by the apparatus type information holding means; and scramble key read permission decision means for searching the authorized apparatus type information storage means for the apparatus type information obtained by the apparatus type information obtaining means, and for permitting the scramble key reading means to read the scramble key from the scramble key storage means only when an authorized apparatus type information corresponding to the obtained apparatus type information is present. This apparatus can prevent the audio data stream stored in the stream storage unit from being read by an audio data recording and reproduction apparatus having no watermarking means. Therefore, even if the audio data stream is read from the stream storage unit, since this audio data stream cannot be descrambled, this audio data stream is prevented from being reproduced or copied without being subjected to watermarking.

According to a thirteenth aspect of the present invention, in accordance with the data recording and reproduction apparatus of the first aspect, the stream storage unit is implemented by an IC card on which a RAM for storing audio data stream and a CPU for controlling access to the audio data stream stored in the RAM are mounted thereon. Therefore, a compact and portable stream storage unit is realized.

According to a fourteenth aspect of the present invention, in accordance with the data recording and reproduction apparatus of the ninth aspect, the stream storage unit is implemented by an IC card on which a RAM for storing an audio data stream and a CPU for controlling access to the audio data stream stored in the RAM are mounted thereon, where the stream storage means and the authorized apparatus type information storage means are implemented by the RAM, and where the apparatus type information obtaining means and the stream read permission decision means are implemented by the CPU. Therefore, readout control for the audio data stream from the stream storage unit can be easily realized by the CPU.

According to a fifteenth aspect of the present invention, in accordance with the data recording and reproduction apparatus of the eleventh aspect, the stream storage unit is implemented by an IC card on which a RAM for storing an audio data stream and a CPU for controlling access to the audio data stream stored in the RAM are mounted thereon, where the stream storage means, the scramble key storage means, and the authorized apparatus type information storage means are implemented by the RAM, and where the apparatus type information obtaining means and the stream read permission decision means are implemented by the CPU. Therefore, readout control for the scrambled audio data stream from the stream storage unit can be easily realized by the CPU.

According to a sixteenth aspect of the present invention, in accordance with the data recording and reproduction apparatus of the twelfth aspect, the stream storage unit is implemented by an IC card on which a RAM for storing an audio data stream and a CPU for controlling access to the audio data stream stored in the RAM are mounted thereon, where the stream storage means, the scramble key storage means, and the authorized apparatus type information storage means are implemented by the RAM, and where the apparatus type information obtaining means and the scramble key read permission decision means are implemented by the CPU. Therefore, readout control for the scramble key of the scrambled audio data stream from the stream storage unit can be easily realized by the CPU.

BRIEF DESCRIPTION OF THE DRAWINGS

FIGS. 2(a)–2(c) are diagrams for explaining the data structures of audio data streams, wherein FIG. 2(a) shows the data structure of an audio data stream supplied from an outside source, FIG. 2(b) shows the data structure of a flag-attached audio data stream, and FIG. 2(c) shows the data structure of a watermark-inserted audio data stream.

FIG. 7 is a diagram for explaining the contents stored in an authorized apparatus type information storage means in the data recording and reproduction apparatus of the third embodiment.

DETAILED DESCRIPTION OF THE PREFERRED EMBODIMENTS

The inventors of the present invention have earnestly studied the problem that the conventional method of inserting a watermark in an audio data stream cannot be simply applied to a data recording and reproduction apparatus to which both a compressed audio data stream and a non-compressed audio data stream are supplied as audio data, and have finally developed a data recording and reproduction apparatus which can insert a watermark into an audio data stream irrespective of whether the supplied audio data stream is a non-compressed audio data stream or a compressed audio data stream.

Figure 18:
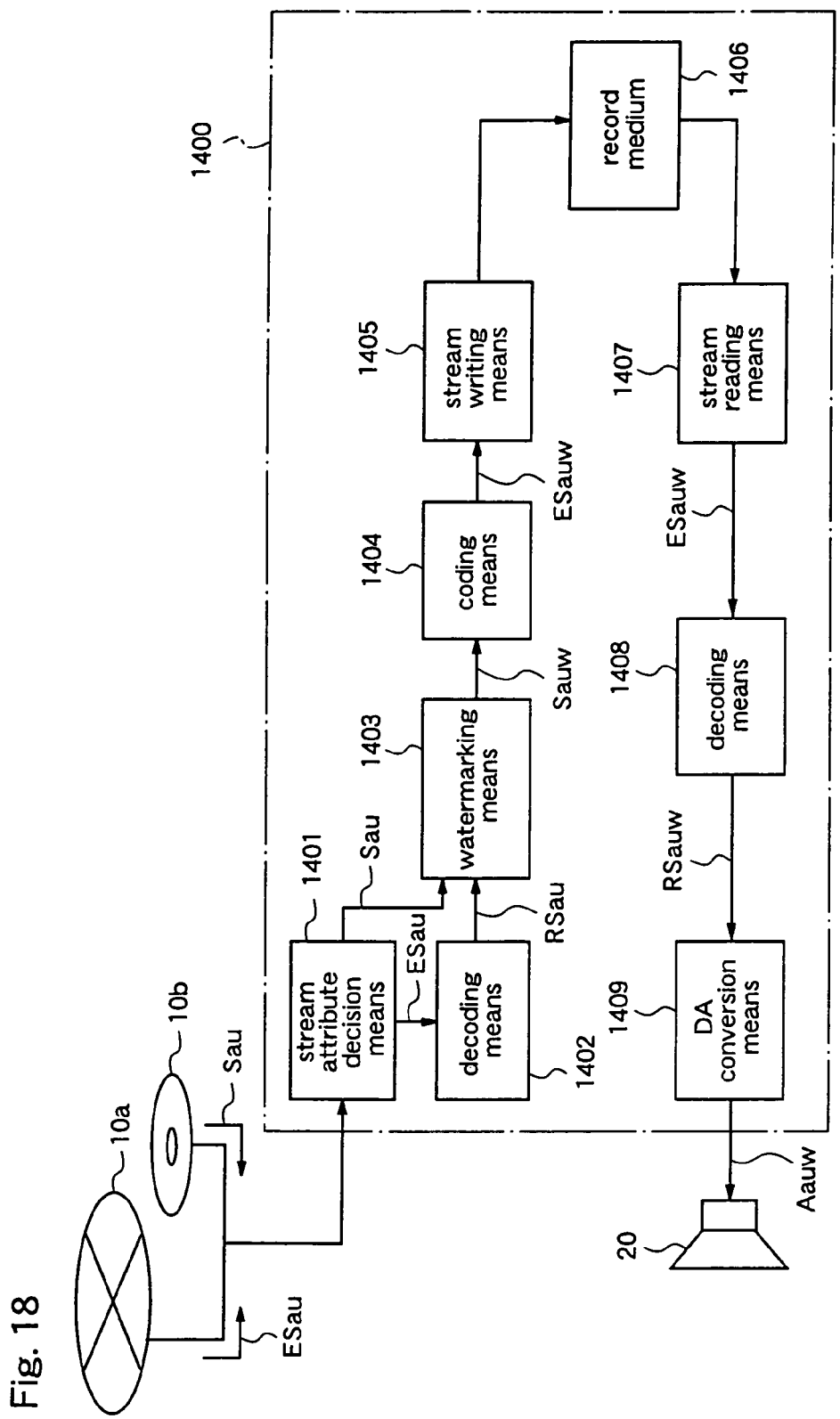
FIG. 18 is a block diagram for explaining a data recording and reproduction apparatus which is able to insert a watermark in either a non-compressed audio data stream or a compressed audio data stream.

FIG. 18 is a block diagram for explaining a data recording and reproduction apparatus 1400 which can insert a watermark in both a non-compressed audio data stream and a compressed audio data stream.

The data recording and reproduction apparatus 1400 is constructed so that it can obtain audio data from both a homepage on a network 10a and a CD 10b. The apparatus 1400 includes a recording medium 1406 in which audio data is recorded, and a stream attribute decision means 1401 for deciding whether the input audio data stream is a compressed audio data stream, ESau or a non-compressed audio data stream Sau.

Further, the data recording and reproduction apparatus 1400 includes a decoding means 1402 and a watermarking means 1403. The decoding means 1402 decompresses, by decoding, the compressed audio data stream ESau output from the stream attribute decision means 1401, and outputs a non-compressed audio data stream RSau. The watermarking means 1403 inserts watermarks in the non-compressed audio data stream Sau output from the stream attribute decision means 1401 and in the non-compressed audio data stream RSau output from the decoding means 1402. The watermarking means 1403 then outputs a watermark-inserted non-compressed audio data stream Sauw.

Further, the data recording and reproduction apparatus 1400 includes a coding means 1404 and a stream writing means 1405. The coding means 1404 compresses, by coding, the watermark-inserted audio data stream Sauw so as to output a compressed audio data stream ESauw. The stream writing means 1405 writes the compressed audio data stream ESauw into the recording medium 1406.

Further, the data recording and reproduction apparatus 1400 includes a stream reading means 1407, a decoding means 1408, and a DA conversion means 1409. The stream reading means 1407 reads the compressed audio data stream ESauw from the recording medium 1406. The decoding means 1408 decompresses, by decoding, the compressed audio data stream ESauw so as to output a non-compressed audio data stream RSauw. The DA conversion means 1409 performs digital-to-analog (DA) conversion on the non-compressed audio data stream RSauw so as to output analog audio data Aauw to a speaker 20.

Figure 12:
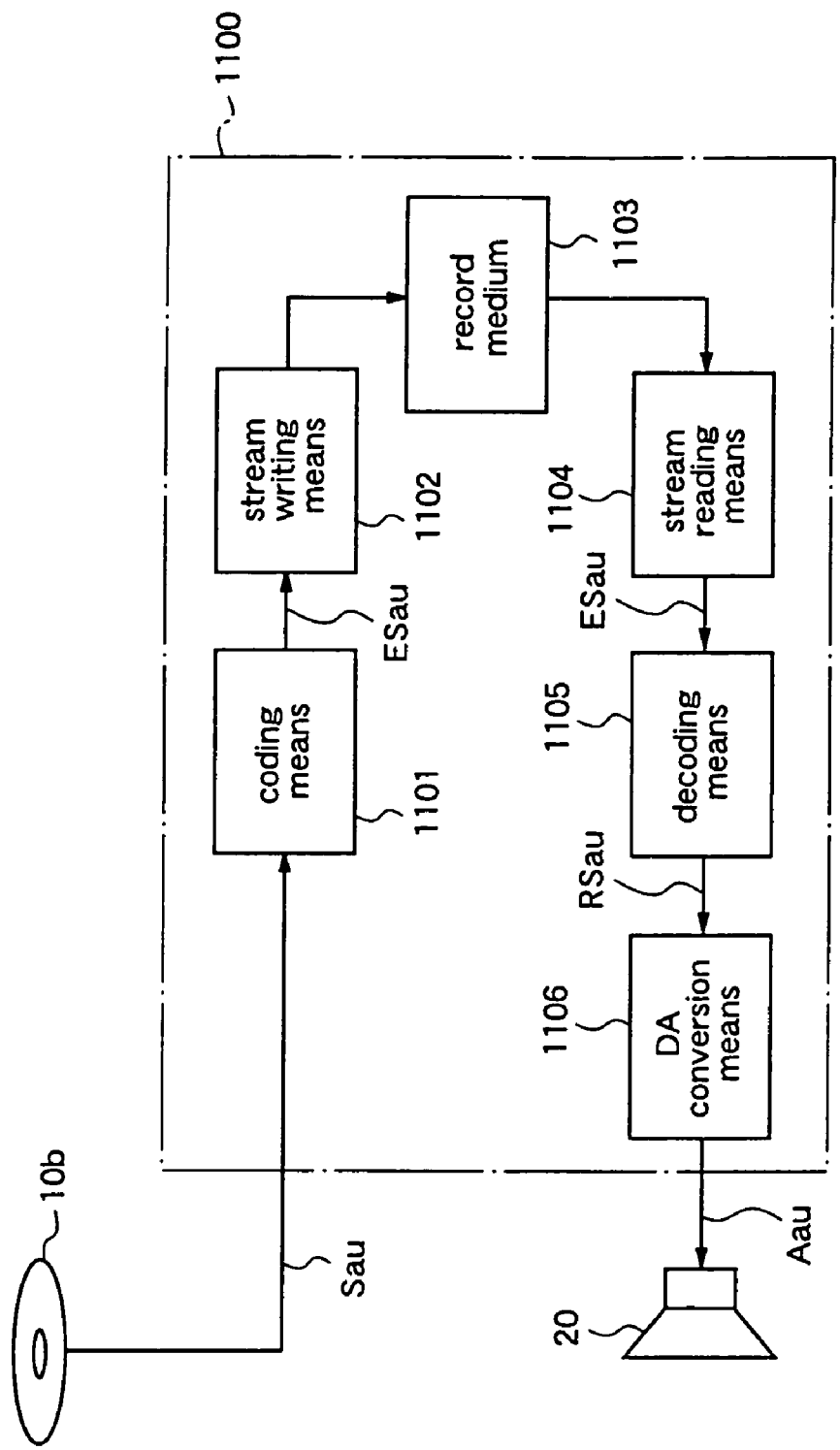
FIG. 12 is a block diagram for explaining a recording and reproduction apparatus (MD player) which is able to record digital audio data recorded on a recording medium such as a CD.
Figure 13:
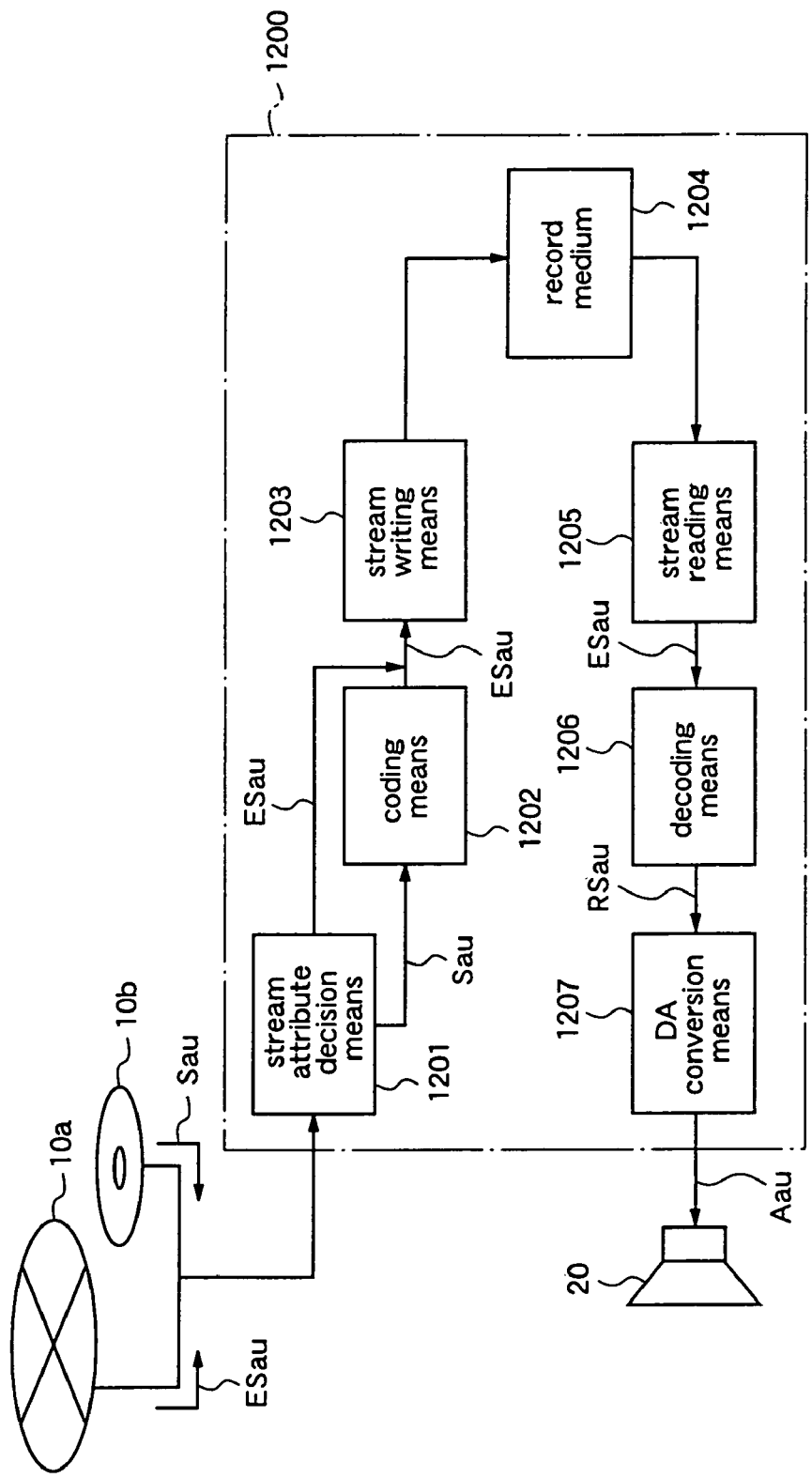
FIG. 13 is a block diagram for explaining a data recording and reproduction apparatus which is able to obtain audio data from either a homepage or a CD and to reproduce the obtained audio data.
Figure 14:
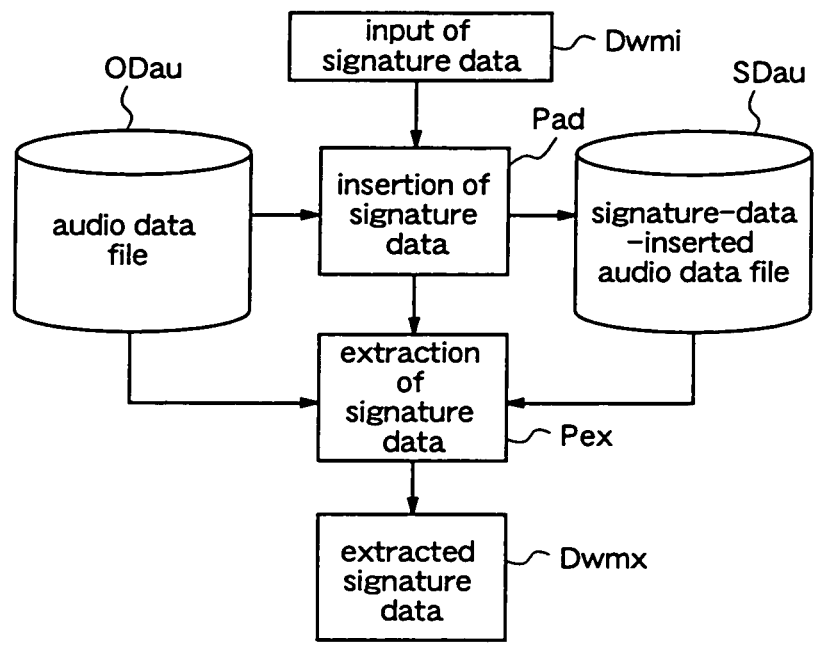
FIG. 14 is a diagram for explaining an outline of a process of inserting and extracting a watermark.
Figure 15:
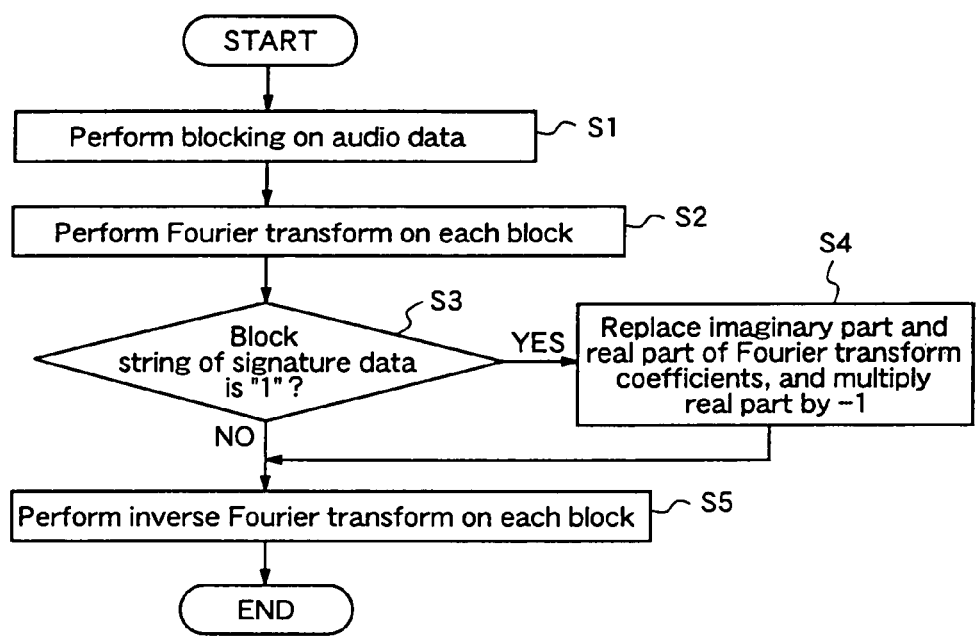
FIG. 15 is a diagram illustrating the watermark insertion process.
Figure 16:
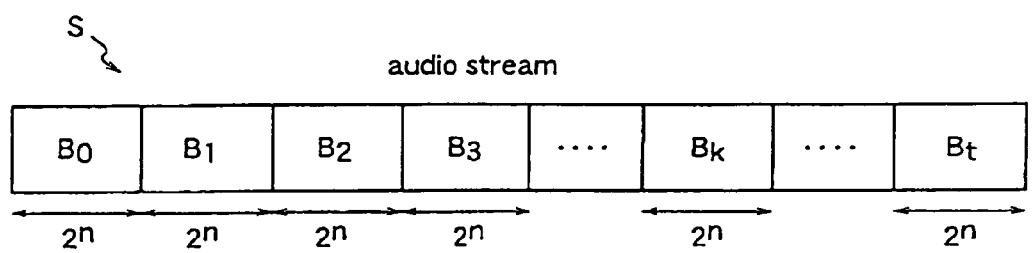
FIG. 16 is a schematic diagram for explaining blocking of a non-compressed audio data stream in the watermark insertion process.
Figure 17:
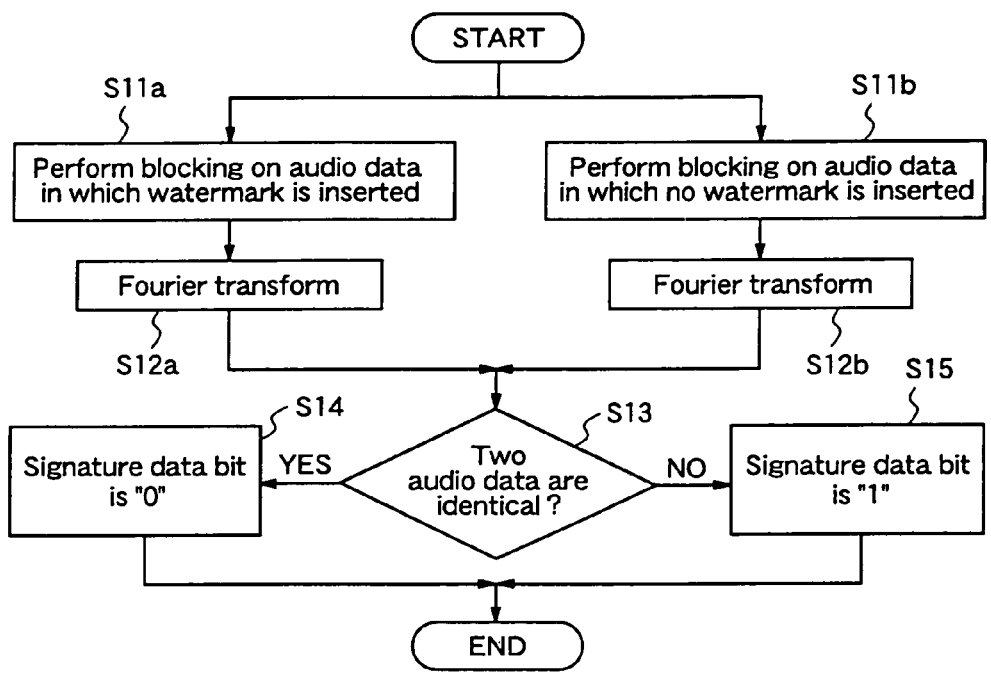
FIG. 17 is a diagram illustrating the watermark extraction process.

In the data recording and reproduction apparatus 1400 so constructed, as in the conventional apparatus 1200 shown in FIG. 12, an input audio data stream is decided whether it is compressed or not in the stream attribute decision means 1401. According to the result of the decision, the data stream is output to either the watermarking means 1403 or the decoding means 1402. For example, in the case where the compressed audio data stream ESau is input to the apparatus 1400 through the network 10a, this compressed audio data stream ESau is output to the decoding means 1402 according to the decision of the stream attribute decision means 1401. In the decoding means 1402, the compressed audio data stream ESau is decompressed by decoding, and the non-compressed audio data stream RSau is output to the watermarking means 1403.

On the other hand, in the case where the non-compressed audio data stream Sau obtained from the CD 10b is input to the data recording and reproduction apparatus 1400, this non-compressed audio data stream Sau is output to the watermarking means 1403 according to the decision of the stream attribute decision means 1401. Accordingly, only a non-compressed audio data stream(RSau or Sau) is output to the watermarking means 1403.

In the watermarking means 1403, a watermark is inserted in the non-compressed audio data stream Sau. The watermark-inserted non-compressed audio data stream Sauw is compressed by coding in the coding means 1404, and is output as the compressed audio data stream ESauw. Further, the compressed audio data stream ESauw is once written in the recording medium 1406 by the stream writing means 1405.

When reproducing the audio data in the data recording and reproduction apparatus 1400, the compressed audio data stream ESauw is read from the recording medium 1406 by the stream reading means 1407. Then, the compressed audio data stream ESauw is decompressed by decoding in the decoding means 1408, and the non-compressed audio data stream RSauw is output from the decoding means 1408.

The non-compressed audio data stream RSauw is converted to the analog audio data Aauw by the DA conversion means 1409 to be output to the speaker 20.

In the data recording and reproduction apparatus 1400, however, there arises a new problem in that recording of audio data takes a significant amount of time because decoding of compressed audio data or coding of non-compressed audio data is carried out when such audio data is recorded in the recording medium. Further, coding and decoding performed on an audio data stream (digital audio data) are usually non-reversible coding and decoding adapted to this coding, respectively, and therefore these processes may degrade the quality of audio data supplied from outside sources.

The inventors of the present invention have made further study to develop a data recording and reproduction apparatus by which the above-described problems are solved.

Hereinafter, a description will be given for a data recording and reproduction apparatus which reduces the time required for recording audio data supplied from outside sources, and which minimizes degradation of the quality of reproduced audio data.

First Embodiment

Figure 1:
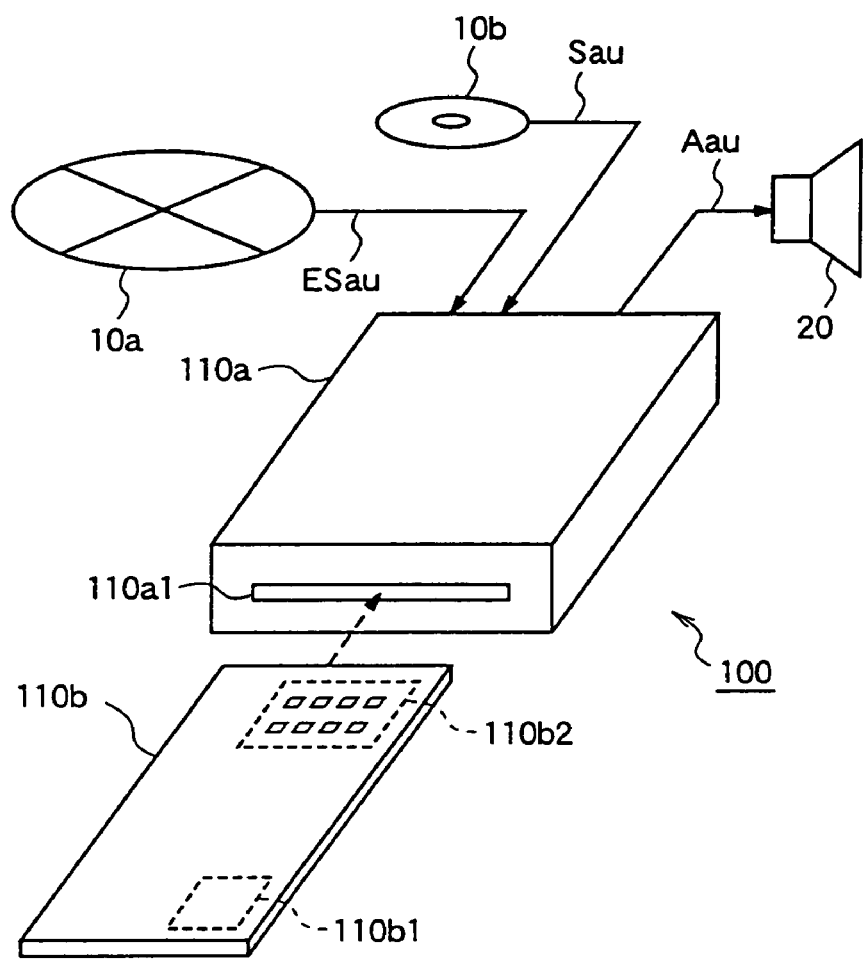
FIG. 1 is a conceptual diagram illustrating the schematic structure of a data recording and reproduction apparatus according to a first embodiment of the present invention.

FIG. 1 is a diagram illustrating the schematic structure of a data recording and reproduction apparatus 100 according to a first embodiment of the present invention.

The data recording and reproduction apparatus 100 comprises an apparatus body 110*a* which performs recording and reproduction of audio data, and a recording medium 110*b* which is detachably mounted in or on the apparatus body 110*a* and which stores the audio data. The data recording and reproduction apparatus 100 is supplied with, as audio data, a compressed audio data stream ESau and a non-compressed audio data stream Sau. In this first embodiment, the compressed audio data stream ESau is downloaded from a network 10*a* while the non-compressed audio data stream Sau is supplied from a portable recording medium 10*b* such as a CD. Further, analog audio data Aau which is output from the apparatus body 110*a* is input to a speaker 20 to be converted to human-perceivable audio.

The recording medium 110*b* is constituted by an IC card which can be inserted into a slot 110*a*1 of the apparatus body 110*a*. This IC card has a RAM (Random Access Memory) 110*b*1 for storing audio data, and a CPU (Central Processing Unit) 110*b*2 for controlling writing of data into the RAM 110*b*.

In the disk drive apparatus 100 so constructed, when the compressed audio data stream ESau from the network 10*a* or the non-compressed audio data stream Sau from the CD is input to the data recording and reproduction apparatus, the data stream is recorded in the recording medium (IC card) 110*b* in the apparatus body 110*a*. On the other hand, when reproducing the audio data, the audio data stream read from the recording medium 110*b* is converted to the analog audio data Aau to be output to the speaker 20. The analog audio data Aau is converted to human-perceivable audio by the speaker 20.

Figure 2:
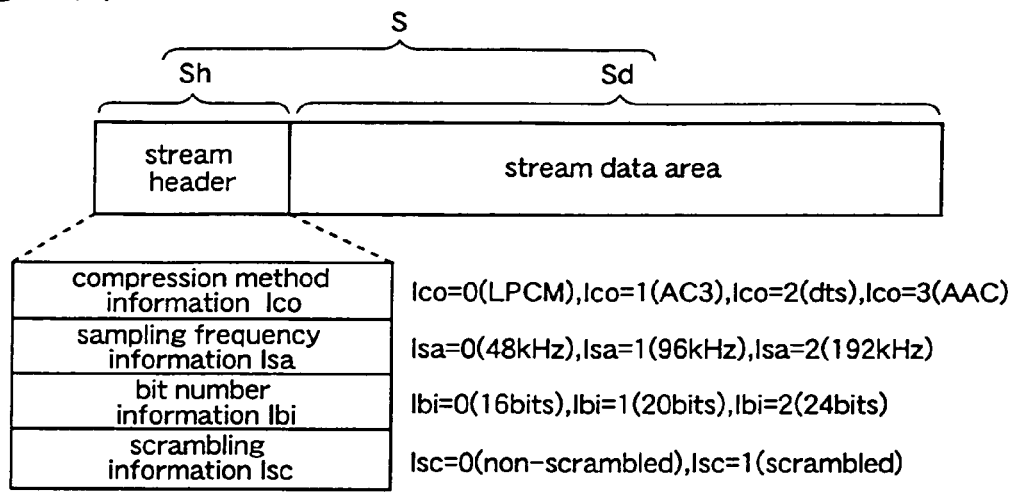
Figure 2:
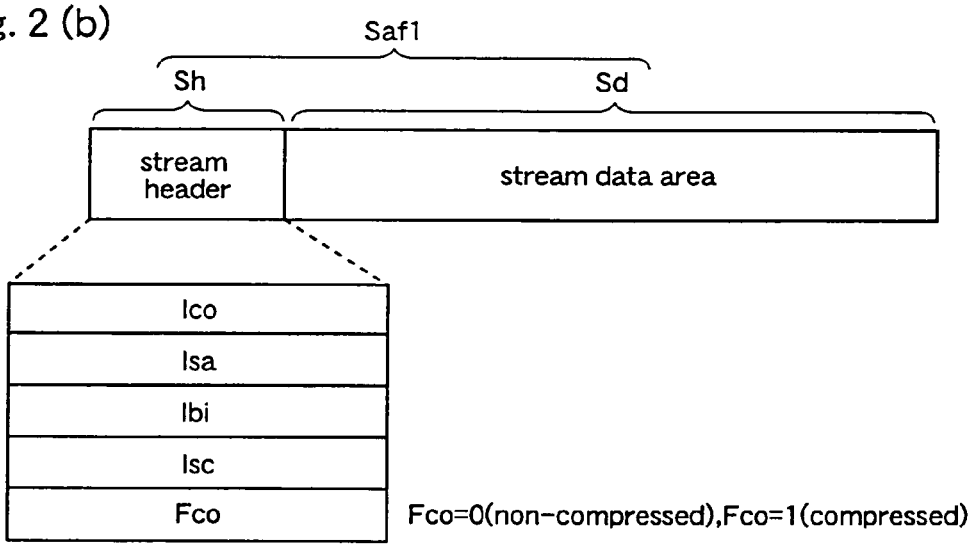
Figure 2:
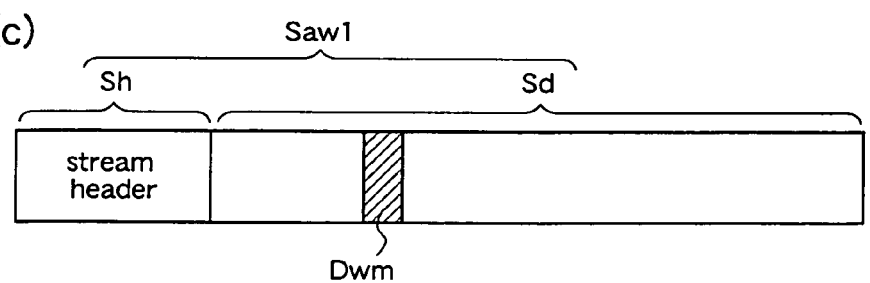

FIG. 2(*a*) is a diagram illustrating the data structure of an audio data stream. Since the compressed audio data stream ESau and the non-compressed audio data stream Sau have the same data structure, these data streams are shown as an audio data stream S in FIG. 2(*a*).

The audio data stream S is composed of a stream header Sh containing information about the stream attribute, and a stream data area Sh containing audio data itself (digital audio data). The stream header Sh contains the following information as the information about the stream attribute: information Ico indicating the compression method for this stream S (compression method information), information Isa indicating the sampling frequency (sampling frequency information), information Ibi indicating the bit number expressing the number of bits of digital data (bit number information), and information Isc indicating whether this stream S is scrambled or not (scrambling information).

To be specific, the value "0" of the compression method information Ico indicates that the audio data stream S is a non-compressed audio data stream obtained by LPCM (Linear Pulse Code Modulation). The value "1", "2", or "3" of the information Ico indicates that the audio data stream S is a compressed audio data stream obtained by AC3 (Audio Compression-3), DTS (Digital Theater System), or AAC (Advanced Audio Coding), respectively. The value "0", "1", or "2" of the sampling frequency information Isa indicates that the sampling frequency of the digital audio data is 48 kHz, 96 kHz, or 192 kHz, respectively. The value "0", "1", or "2" of the bit number information Ibi indicates that the digital audio data is digital data of 16 bits, 20 bits, or 24 bits, respectively. The value "0" of the scrambling information Isc indicates that the audio data stream is not scrambled, and the value "1" of the scrambling information Isc indicates that the audio data stream is scrambled.

It is not necessary to describe the structure of the stream data area Sd in detail because the stream data area Sd is not the main subject of the present invention.

Hereinafter, the data recording and reproduction apparatus 100 will be described in detail.

Figure 3:
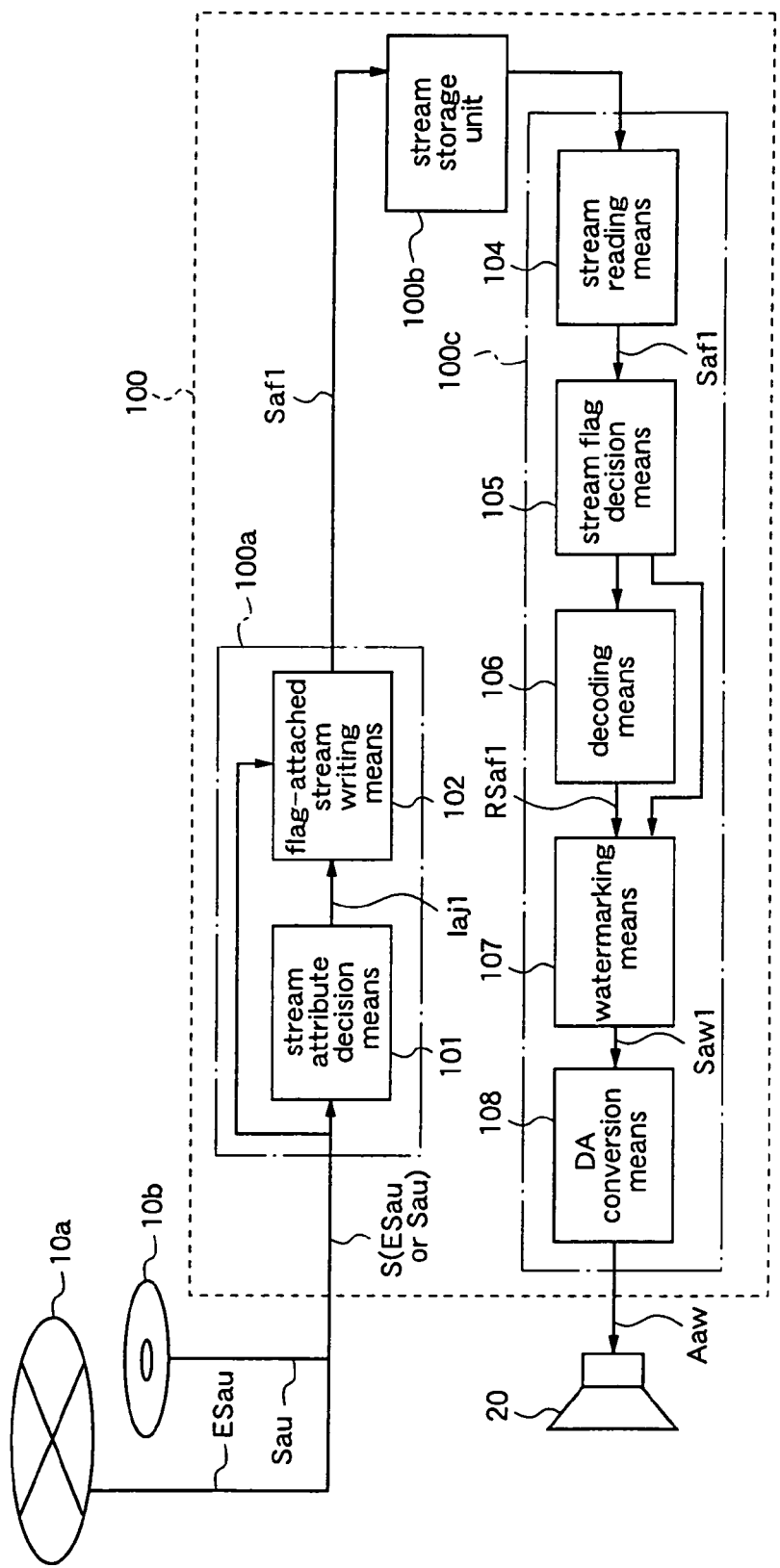
FIG. 3 is a block diagram illustrating the structure of the data recording and reproduction apparatus according to the first embodiment.

FIG. 3 is a block diagram illustrating the structure of the data recording and reproduction apparatus 100.

The data recording and reproduction apparatus 100 receives the compressed audio data stream ESau from the network 10*a* or the non-compressed audio data stream Sau from the recording medium 10*b* such as a CD as the audio data stream S having the data structure shown in FIG. 2(*a*).

The data recording and reproduction apparatus 100 comprises a stream storage unit 100*b* for storing the audio data streams ESau and Sau, a stream writing unit 100*a* for writing these audio data streams into the stream storage unit 100*b*, and a stream reading unit 100*c* for reading these audio data streams from the stream storage unit 100*b*.

The stream writing unit 100*a* and the stream reading unit 100*c* are mounted on the apparatus body 110*a* shown in FIG. 1. The stream storage unit 100*b* corresponds to the recording medium 110*b* shown in FIG. 1, and the stream storage unit 100*b* is constituted by the above-described IC card 110*b* on which a semiconductor memory device (RAM) is mounted thereon.

The stream writing unit 100*a* comprises a stream attribute decision means 101 and a flag-attached stream writing means 102. The stream attribute decision means 101 decides whether the audio data stream S supplied from the outside is compressed or not, and outputs attribute decision information Iaj1 indicating the result of the decision. The flag-attached stream writing means 102 attaches a compression ID flag Fco, which is set to a predetermined value, to the header Sh of the audio data stream S (refer to FIG. 2(b)) in accordance with the attribute decision information Iaj1, and writes the audio data stream Saf1 with the compression ID flag Fco in the stream storage unit 100b. The flag-attached stream writing means 102 sets the value of the compression ID flag Fco to "0" when the attribute decision information Iaj1 indicates that the input audio data stream is a non-compressed stream. On the other hand, the flag-attached stream writing means 102 sets the value of the compression ID flag Fco to "1" when the attribute decision information Iaj1 indicates that the input audio data stream is a compressed stream. The non-compressed audio data stream is a data stream in which digital audio data stored in its stream data area is not compressed, while the compressed audio data stream is a data stream in which digital audio data stored in its stream data area is compressed.

The stream reading unit 100c includes a stream reading means 104 and a stream flag decision means 105. The stream reading means 104 reads the audio data stream Saf1 from the stream storage unit 100b. The stream flag decision means 105 decides whether the audio data stream Saf1 is a non-compressed stream or a compressed stream in accordance with the value of the compression ID flag Fco included in the audio data stream Saf1 which has been read by the stream reading means 104, and outputs these streams separately.

The stream reading unit 100c further includes a decoding means 106 and a watermarking means 107. The decoding means 106 decompresses, by decoding, the compressed audio data stream output from the stream flag decision means 105, and outputs a decompressed audio data stream RSaf1. As can be seen in FIG. 3, the non-compressed audio data stream Saf1 output from the stream flag decision means 105 is not input into the decoding means 106. The watermarking means 107 inserts a watermark Dwm into the stream data area Sd (refer to FIG. 2(c)) of the non-compressed audio data stream Saf1 output from the stream flag decision means 105, or the watermarking means 107 inserts a watermark Dwm into the stream data area Sd of the decompressed audio data stream RSaf1 output from the decoding means 106, and outputs a watermark-inserted audio data stream Saw1.

Further, the stream reading unit 100c includes a DA conversion means 108. The DA conversion means 108 performs DA conversion on the watermark-inserted audio data stream Saw1 to output analog audio data Aaw to a speaker 20. The analog audio data Aaw is converted to human-perceivable audio by the speaker 20.

The watermark Dwm inserted in the audio data stream by the watermarking means 107 is a flag indicating "copy inhibit" so as to protect the copyright for the audio data stream.

This watermark is inserted in a non-compressed digital audio data (audio data stream), and the watermark-inserted audio data stream is converted to analog audio data.

Generally, a watermark can be detected by comparing digital audio data (audio data stream) which includes a watermark with digital audio data (audio data stream) which does not include a watermark. Further, a watermark can be detected by comparing analog audio data which includes a watermark (DA-converted digital audio data including a watermark) with analog audio data which does not include a watermark (DA-converted digital audio data which does not include watermark).

In this first embodiment, with respect to the analog audio data Aaw obtained by the DA conversion of the watermark-inserted audio data stream Saw, it is possible to detect the watermark from this analog audio data Aaw by analyzing this data Aaw or by analyzing the audio data stream obtained by AD (analog-to-digital) conversion of this data Aaw.

Next, the operation of the data recording and reproduction apparatus 100 will be described.

Initially, a description will be given of the operation of writing an audio data stream into the IC card (recording medium) constituting the stream storage unit 10b.

When an audio data stream S is supplied from an outside source to the data recording and reproduction apparatus 100 of the first embodiment, the stream attribute decision means 101 decides whether the input audio data stream S is a compressed audio data stream ESau or a non-compressed audio data stream Sau, and outputs attribute decision information Iaj1 indicating the result of the decision. To be specific, the decision by the stream attribute decision means 101 is performed according to the compression method information Ico included in the stream header Sh of the input audio data stream S. For example, when the value of the compression method information Ico is "0", information indicating that the audio data stream S is not compressed is output as the attribute decision information Iaj1 from the stream attribute decision means 101. When the value of the compression method information Ico is "1", "2" or "3", information indicating that the audio data stream S is compressed is output as the attribute decision information Iaj1 from the stream attribute decision means 101.

Usually, the audio data stream S downloaded through the network 10a is the compressed audio data stream ESau, and the audio data stream S read from the portable recording medium 10b such as a CD is the non-compressed audio data stream Sau.

Thereafter, in the flag-attached stream writing means 102, a compression ID flag Fco is attached to the stream header Sh of the audio data stream S in accordance with the attribute decision information Iaj1 (refer to FIG. 2(b)), and the flag-attached audio data stream Saf1 is written in the stream storage unit 100b by the writing means 102. For example, when the stream attribute decision means 101 decides that the audio data stream downloaded through the network 10a is compressed, the flag-attached stream writing means 102 sets the compression ID flag Fco to "1". On the other hand, when the stream attribute decision means 101 decides that the audio data stream read from the CD is not compressed, the flag-attached stream writing means 102 sets the compression ID flag Fco to "0".

Next, a description will be given of the operation of reading the audio data stream from the stream storage unit 100b.

When reproducing the audio data, a stream read request is output initially from the stream reading means 104 to the stream storage unit 100b and, thereafter, the flag-attached audio data stream Saf1 is read from the stream storage unit 100b by the stream reading means 104. Then, the stream flag decision means 105 decides whether the audio data stream Saf1 is compressed or not according to the value of the compression ID flag Fco in the stream header Sh of the audio data stream Saf1.

When it is decided that the read audio data stream is compressed (fco=1), the audio data stream Saf1 is output from the stream flag decision means 105 to the decoding means 106. On the other hand, when it is decided that the read audio data stream is not compressed (fco=0), the non-compressed audio data stream Saf1 is output from the stream flag decision means 105 to the watermarking means 107.

In the decoding means 106, the compressed audio data stream Saf1 is decompressed by decoding, and the decompressed audio data stream RSaf1 is output from the decoding means 106 to the watermarking means 107.

In the watermarking means 107, a watermark Dwm is inserted in the non-compressed audio data stream, i.e., either the non-compressed audio data stream Saf1 output from the stream flag decision means 105 or the decompressed audio data stream RSaf1 output from the decoding means 106.

The watermark-inserted audio data stream Saw1 (refer to FIG. 2(c)) is converted to analog audio data Aaw by the DA conversion means 108 to be output to the speaker 20. In the speaker 20, the analog audio data Aaw is converted to audio to which a normal human ear responds.

As described above, the data recording and reproduction apparatus 100 of the first embodiment is provided with the stream attribute decision means 101 which decides whether an audio data stream supplied from the outside is compressed or not, and which generates a compression ID flag Fco having a value according to the result of the decision. This flag Fco is attached to the audio data stream, and the audio data stream with the flag Fco attached hereto is written in the stream storage unit 100b. Therefore, it is possible to decide whether or not the audio data stream read from the stream storage unit 100b is to be decompressed by decoding in accordance with the compression ID flag Fco attached to the audio data stream.

Accordingly, after reading the compressed audio data stream from the stream storage unit 100b, the compressed audio data stream is decompressed, and a watermark is inserted in the non-compressed audio data stream obtained by the decompression.

In other words, with respect to the compressed audio data stream supplied from an outside source such as the network 10a or the recording medium 10b, it is written in the stream storage unit 100b immediately after the simple process of attaching a compression ID flag to the stream, whereby the time required for writing the compressed audio data stream in the stream storage unit 100b can be reduced.

Further, the quality of analog audio data obtained by reproducing the compressed audio data stream supplied from an outside source is prevented from being degraded.

In the case where watermarking is performed before writing the compressed audio data stream in the stream storage unit 10b, the following processes are required: decompression (decoding) to convert the compressed audio data stream to the non-compressed audio data stream; watermarking to insert a watermark in the non-compressed audio data stream; and compression (coding) to compress the watermark-inserted non-compressed audio data stream. In this case, since the decompression and the compression are processes adapted to non-reversible coding, degradation of sound quality occurs due to these processes. In contrast, in the case where watermarking is performed after reading the compressed audio data stream from the stream storage unit 100b, only the above-described decompression and watermarking processes are required, and therefore, degradation of sound quality due to compression can be avoided.

Further, this first embodiment employs, as a watermark, a flag indicating that audio data including the flag (watermark) is copy inhibited, thereby restricting copying of the audio data including the watermark. However, the copyright protection method using watermarking is not restricted thereto.

For example, there is a method called "generation management" in which a flag indicating how many times (generations) an audio data stream has been copied in the past is inserted in the audio data stream as a watermark, and the audio data stream is copy inhibited when a predetermined number of times (generations) is exceeded. Furthermore, there is a method in which information indicating the name or the like of the copyright holder of an audio data stream is inserted in the stream as a watermark and, when the audio data stream is copied without permission, the name of the copyright holder is extracted from the audio data stream according to the watermark so as to clarify the copyright holder.

Second Embodiment

Figure 4:
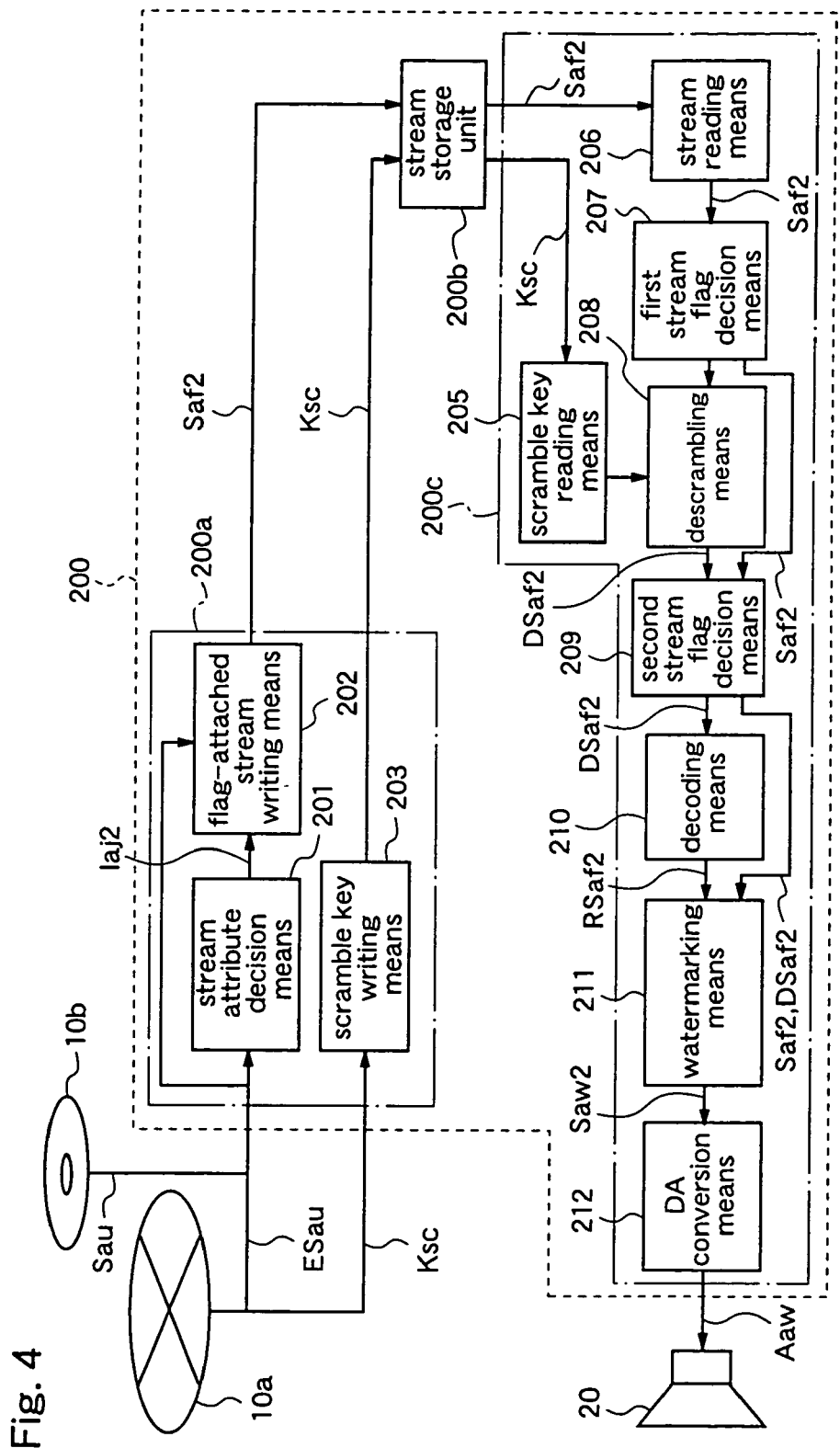
FIG. 4 is a block diagram for explaining a data recording and reproduction apparatus according to a second embodiment of the present invention.

FIG. 4 is a block diagram for explaining a data recording and reproduction apparatus 200 according to a second embodiment of the present invention.

The schematic structure of the data recording and reproduction apparatus 200 of this second embodiment is identical to that of the apparatus 100 of the first embodiment shown in FIG. 1. That is, the data recording and reproduction apparatus 200 is composed of an apparatus body which performs recording and reproduction of audio data, and a recording medium which is detachably mounted in or on the body and which stores the audio data.

Turning to FIG. 4, the data recording and reproduction apparatus 200 is supplied with, as audio data, a compressed audio data stream ESau, a non-compressed audio data stream Sau, or a scrambled compressed audio data stream ESau. When the scrambled compressed audio data stream ESau is input to the apparatus 200, a scramble key Ksc for descrambling is also input to the apparatus 200.

In this second embodiment, in order to simplify the description thereof, it is premised that a scrambled compressed audio data stream ESau with the corresponding scramble key Ksc or a non-scrambled compressed audio data stream ESau is downloaded through a network 10a to the apparatus 200, while a non-scrambled, non-compressed audio data stream Sau is supplied from a portable recording medium 10b such as a CD to the apparatus 200. Further, each of the audio data streams has the data structure shown in FIG. 2(a).

To be specific, the data recording and reproduction apparatus 200 comprises a stream storage unit 200b for storing audio data streams supplied from outside sources such as the network 10a or the portable recording medium 10b, a stream writing unit 200a for writing the audio data streams into the stream storage unit 200b, and a stream reading unit 200c for reading the audio data streams from the stream storage unit 200b.

The stream writing unit 200a and the stream reading unit 200c are mounted on the apparatus body (refer to FIG. 1). The stream storage unit 200b corresponds to the recording medium, and it is constituted by the above-described IC card on which a semiconductor memory device (RAM) is mounted thereon.

The stream writing unit 200a includes a stream attribute decision means 201 and a scramble key writing means 203. The stream attribute decision means 201 decides whether the audio data stream S supplied from the outside is compressed or not and whether the audio data stream S is scrambled or not, and outputs attribute decision information Iaj2 indicating the result of the decision. The scramble key writing means 203 writes a scramble key Ksc for descrambling the scrambled audio data stream in the stream storage unit 200b. The scramble key Ksc is supplied from outside of the apparatus 200.

Further, the stream writing unit 200a includes a flag-attached stream writing means 202. The flag-attached stream writing means 202 attaches a compression ID flag Fco having a predetermined value and a scramble ID flag Fsc having a predetermined value to the header Sh of the audio data stream S (refer to FIG. 5) in accordance with the attribute decision information Iaj2, and writes the audio data stream Saf2 with these flags Fco and Fsc in the stream storage unit 200b.

The flag-attached stream writing means 202 sets the values of the compression ID flag Fco and the scramble ID flag Fsc as follows. When the attribute decision information Iaj2 indicates that the input audio data stream is a non-compressed stream, the value of the compression ID flag Fco is set to "0". When the attribute decision information Iaj2 indicates that the input audio data stream is a compressed stream, the value of the compression ID flag Fco is set to "1". When the attribute decision information Iaj2 indicates that the input audio data stream is not scrambled, the value of the scramble ID flag Fsc is set to "0". When the attribute decision information Iaj2 indicates that the input audio data stream is scrambled, the value of the scramble ID flag Fsc is set to "1".

The non-compressed audio data stream is a data stream in which digital audio data stored in its stream data area is not compressed, while the compressed audio data stream is a data stream in which digital audio data stored in its stream data area is compressed. The non-scrambled audio data stream is a data stream in which digital audio data stored in its stream data area is not scrambled, while the scrambled audio data stream is a data stream in which digital audio data stored in its stream data area is scrambled.

The stream reading unit 200c includes a stream reading means 206 and a first stream flag decision means 207. The stream reading means 206 reads the audio data stream Saf2 from the stream storage unit 200b. The first stream flag decision means 207 decides whether the audio data stream Saf2 is scrambled or non-scrambled in accordance with the value of the scramble ID flag Fsc included in the audio data stream Saf2 which has been read by the stream reading means 206, and outputs these streams separately.

The stream reading unit 200c further includes a scramble key reading means 205 and a descrambling means 208. The scramble key reading means 205 reads the scramble key Ksc from the stream storage unit 200b. The descrambling means 208 descrambles the scrambled audio data stream output from the first stream flag decision means 207 by using the scramble key Ksc, and outputs a descrambled audio data stream DSaf2. As can be seen in FIG. 4, the non-scrambled audio data stream Saf2 output from the first stream flag decision means 207 is not input into the descrambling means 208.

Further, the stream reading unit 200c includes a second stream flag decision means 209 and a decoding means 210. The second stream flag decision means 209 receives either the non-scrambled audio data stream Saf2 output from the first stream flag decision means 207 or the descrambled audio data stream DSaf2 output from the descrambling means 208, decides whether the audio data streams Saf2 and DSaf2 are non-compressed data streams or compressed data streams in accordance with the values of the compression ID flags Fco included in these streams, and outputs these streams separately. The decoding means 210 decompresses, by decoding the compressed audio data stream DSaf2 output from the decision means 209, and outputs a decompressed audio data stream RSaf2.

The stream reading unit 200c further includes a watermarking means 211 and a DA conversion means 212. The watermarking means 211 inserts a watermark Dwm into the data area Sd of the non-compressed audio data stream Saf2 or DSaf2 (refer to FIG. 2(c)) output from the second stream flag decision means 209 or into the data area Sd of the decompressed audio data stream RSaf1 output from the decoding means 210, and outputs a watermark-inserted audio data stream Saw2. The DA conversion means 212 performs DA conversion on the watermark-inserted audio data stream Saw2 to output analog audio data Aaw to a speaker 20. The analog audio data Aaw is converted to human-perceivable audio by the speaker 20.

In many cases, the stream writing unit 200a is constructed as an apparatus for writing the audio data stream and the scramble key into the stream storage unit 200b, and the stream reading unit 200c is constructed as another apparatus for reading the audio data stream and the scramble key from the stream storage unit 200b.

Further, the watermark Dwm to be inserted in the audio data stream by the watermarking means 210 is a flag indicating "copy inhibit" as in the first embodiment of the invention.

Next, the operation of the data recording and reproduction apparatus 200 will be described.

Initially, the operation of writing an audio data stream into the stream storage unit (recording medium) 200b will be described.

When an audio data stream is supplied from an outside source to the data recording and reproduction apparatus 200, the stream attribute decision means 201 decides whether the input audio data stream is compressed or not and whether the input audio data stream is scrambled or not, and outputs attribute decision information Iaj2 according to the result of the decision.

Figure 5:
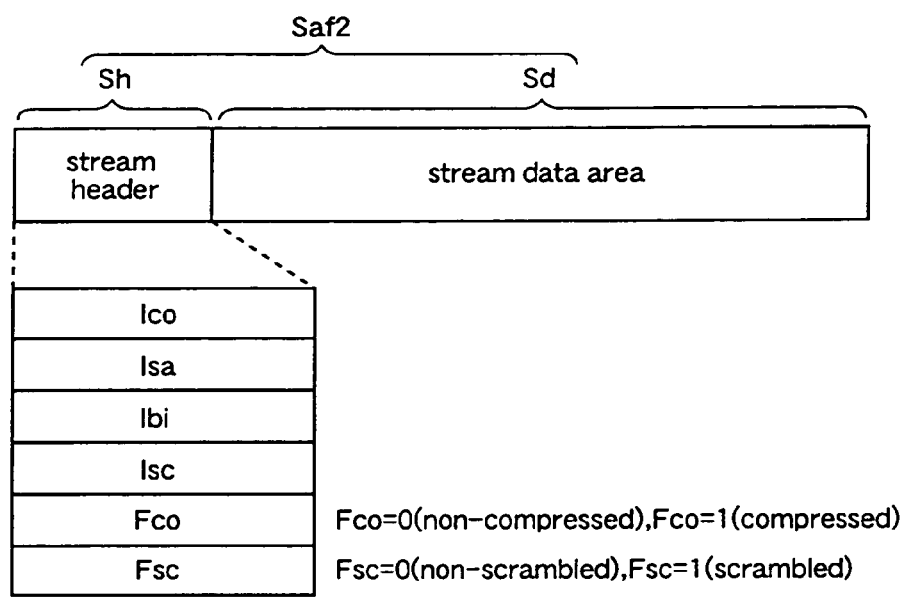
FIG. 5 is a diagram illustrating the data structure of a flag-attached audio data stream according to the second and fifth embodiments of the present invention.

To be specific, the decision of the stream attribute decision means 201 depends on the values of the compression method information Ico and the scrambling information Isc which are stored in the stream header Sh of the input audio data stream (refer to FIG. 5). For example, when the value of the compression method information Ico is "0", the audio data stream S is decided as being not compressed. When the value of the compression method information Ico is "1", "2" or "3", the audio data stream S is decided as being compressed. Further, when the value of the scrambling information Isc is "0", the audio data stream S is decided as being not scrambled. When the value of the scrambling information Isc is "1", the audio data stream S is decided as being scrambled.

Generally, the audio data stream downloaded from the network 10a is the scrambled compressed audio data stream ESau or the non-scrambled compressed audio data stream ESau, while the audio data stream read from the portable recording medium 10b such as a CD is the non-scrambled, non-compressed audio data stream Sau.

Thereafter, in the flag-attached stream writing means 202, the compression ID flag Fco and the scramble ID flag Fsc are attached to the stream header Sh of the audio data stream in accordance with the attribute decision information Iaj2 (refer to FIG. 5), and the flag-attached audio data stream Saf2 is written in the stream storage unit 200b by the flag-attached stream writing means 202.

For example, when the input audio data stream is decided as being compressed and scrambled, the values of the compression ID flag Fco and the scramble ID flag Fsc are each set to "1". When the input audio data stream is decided as being compressed but not scrambled, the value of the compression ID flag Fco is set to "1" and the value of the scramble ID flag Fsc is set to "0". When the input audio data stream is decided as being not compressed but scrambled, the value of the compression ID flag Fco is set to "0" and the value of the scramble ID flag Fsc is set to "1". Further, when the input audio data stream is decided as being neither compressed nor scrambled, the values of the compression ID flag Fco and the scramble ID flag Fsc are each set to "0".

Further, when the input audio data stream is scrambled, the scramble key Ksc for descrambling this audio data stream is input to the data recording and reproduction apparatus 200, and this scramble key Ksc is written in the stream storage unit 200b by the scramble key writing means 203.

Next, the operation of reading the audio data stream from the stream storage unit 200b will be described.

When reproducing the audio data, a stream read request is output initially from the stream reading means 206 to the stream storage unit 200b, and thereafter, the flag-attached audio data stream Saf2 is read from the stream storage unit 200b by the stream reading means 206. Then, the first stream flag decision means 207 decides whether the audio data stream Saf2 is scrambled or not according to the value of the scramble ID flag Fsc included in the stream header Sh of the audio data stream Saf2.

When the read audio data stream Saf2 is decided as being scrambled, the audio data stream Saf2 is output from the first stream flag decision means 207 to the descrambling means 208. Further, the scramble key Ksc corresponding to the read audio data stream Saf2 is read from the stream storage unit 200b by the scramble key reading means 205 to be output to the descrambling means 208. In the descrambling means 208, the read audio data stream Saf2 is descrambled by using the corresponding scramble key Ksc, and the descrambled audio data stream DSaf2 is output to the second stream flag decision means 209.

On the other hand, when the first stream flag decision means 207 decides that the read audio data stream is not scrambled, the audio data stream Saf2 is output from the first stream flag decision means 207 to the second stream flag decision means 209.

In the second stream flag decision means 209, it is decided whether the audio data stream Saf2 or the descrambled audio data stream DSaf2 is compressed or not according to the value of the compression ID flag Fco included in the stream header Sh of the audio data stream Saf2.

When the second stream flag decision means decides that the read audio data stream Saf2 or DSaf2 is compressed, the audio data stream Saf2 or DSaf2 is output from the second stream flag decision means 209 to the decoding means 210. In the decoding means 210, the compressed audio data stream Saf2 or DSaf2 is decompressed by decoding, and the decompressed audio data stream RSaf is output from the decoding means 210 to the watermarking means 211.

On the other hand, when the second stream flag decision means 209 decides that the read audio data stream Saf2 or DSaf2 is not compressed, the audio data stream Saf2 or DSaf2 is output from the second stream flag decision means 209 to the watermarking means 211.

In the watermarking means 211, a watermark Dwm is inserted in the non-compressed audio data stream, i.e., the non-compressed audio data stream Saf2 or DSaf2 output from the second stream flag decision means 209, or the decompressed audio data stream RSaf output from the decoding means 210.

The watermark-inserted audio data stream Saw2 is converted to analog audio data Aaw by the DA conversion means 212 to be output to the speaker 20. In the speaker 20, the analog audio data Aaw is converted to human-perceivable audio.

As described above, the data recording and reproduction apparatus 200 of the second embodiment is provided with the stream attribute decision means 201 which decides whether an audio data stream supplied from the outside is compressed or not and whether the audio data stream is scrambled or not, and which generates a compression ID flag Fco and a scramble ID flag Fsc according to the result of the decision. These ID flags Fco and Fsc are attached to the audio data stream, and the audio data stream with these flags attached thereto is written in the stream storage unit 200b. Therefore, it is possible to decide that the audio data stream read from the stream storage unit 100b is to be subjected to both decoding and descrambling processes, or one of these processes, or none of these processes, in accordance with the ID flags Fco and Fsc included in the audio data stream.

Accordingly, after reading the compressed audio data stream or the scrambled audio data stream from the stream storage unit 200b, it is decompressed or descrambled, respectively, and a watermark is inserted in the non-scrambled, non-compressed audio data stream. Thereby, the quality of reproduced audio data is prevented from being degraded, as described for the first embodiment.

Further, with respect to the compressed audio data stream or the scrambled compressed audio data stream supplied from an outside source, such a data stream is written in the stream storage unit immediately after the simple process of attaching a compression ID flag and a scramble ID flag Fsc to the stream, whereby the time required for writing the compressed audio data stream in the stream storage unit can be reduced.

Further, this second embodiment employs, as a watermark, a flag indicating that audio data including the flag (watermark) is copy inhibited, thereby restricting copying of the audio data including the watermark. However, the copyright protection method using watermarking is not restricted thereto, and those methods described for the first embodiment may be employed.

Third Embodiment

Figure 6:
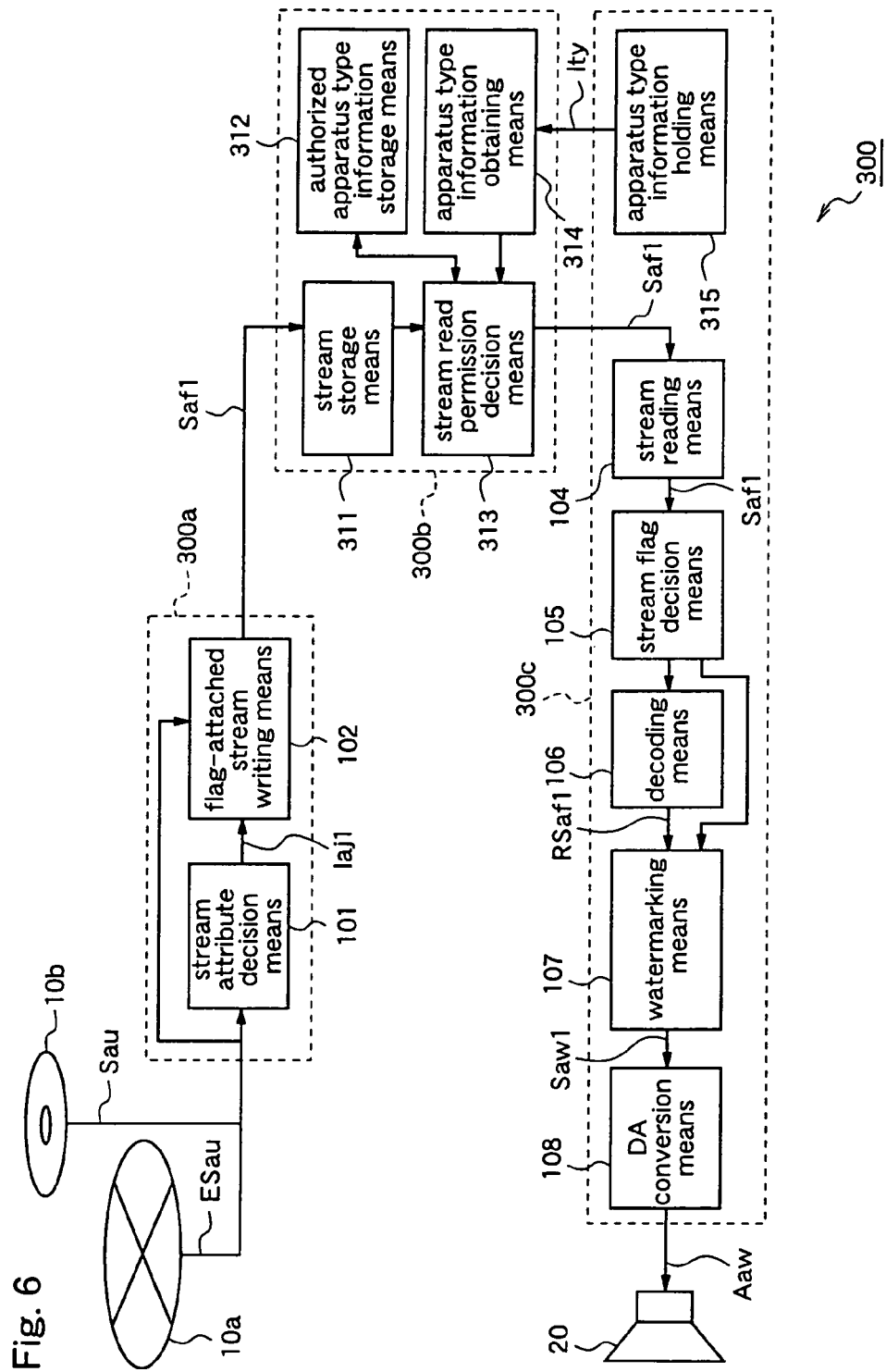
FIG. 6 is a block diagram for explaining a data recording and reproduction apparatus according to a third embodiment of the present invention.

FIG. 6 is a block diagram for explaining a data recording and reproduction apparatus 300 according to a third embodiment of the present invention.

The data recording and reproduction apparatus 300 is composed of a stream storage unit 300b for storing an audio data stream supplied from an outside source, a stream writing unit 300a for writing the audio data stream into the stream storage unit 300b, and a stream reading unit 300c for reading the audio data stream from the stream storage unit 300b.

The stream writing unit 300a and the stream reading unit 300c are mounted on the apparatus body 10a (refer to FIG. 1). The stream storage unit 300b corresponds to the recording medium which is detachably mounted in or on the apparatus body 110a, and the recording medium 110b is constituted by an IC card on which a semiconductor memory device (RAM) is mounted thereon. However, the stream storage unit 300b is not restricted to an IC card type device, and it may be constituted by a memory stick type device.

Further, the audio data stream supplied from the outside is either a compressed audio data stream ESau or a non-compressed audio data stream Sau, as in the first embodiment of the invention. For example, the compressed audio data stream ESau is downloaded through a network 10*a*, and the non-compressed audio data stream Sau is supplied from a portable recording medium 10*b* such as a CD.

Hereinafter, the constituents of the apparatus will be described in detail.

The stream writing unit 300*a* is identical to the stream writing unit 100*a* of the first embodiment including the stream attribute decision means 101 and the flag-attached stream writing means 102.

The stream reading unit 300*c* includes an apparatus type information holding means 315 for holding information (apparatus type information Ity) which indicates the type of the data recording and reproduction apparatus 300 in addition to the constituents of the stream reading unit 100*c* of the first embodiment. In the apparatus type information holding means 315, a predetermined value, for example, "1" or "0", is stored in advance as the value of the apparatus type information Ity.

The stream storage unit 300*b* includes a stream storage means 311 and an authorized apparatus type information storage means 312. The stream storage means 311 stores the audio data stream output from the stream writing means 102. The authorized apparatus type information storage means 312 stores the value of information (authorized apparatus type information Ity) indicating the type of apparatus which is permitted to read the audio data stream from the stream storage means 311.

FIG. 7 is a diagram illustrating the contents stored in the authorized apparatus type information storage means 312. The value "0" of the authorized apparatus type information Ity stored in the storage means 312 indicates that the corresponding data recording and reproduction apparatus is a player having the function of inserting a watermark at the time of reproduction. The value "1" of the authorized apparatus type information Ity stored in the storage means 312 indicates that the corresponding data recording and reproduction apparatus is a recorder having the function of inserting a watermark at the time of reproduction.

The stream storage unit 300*b* further includes an apparatus type information obtaining means 314 and a stream read permission decision means 313. The apparatus type information obtaining means 314 reads the value of the apparatus type information Ity of the data recording and reproduction apparatus 300 from the apparatus type information storage means 315 in the stream reading unit 300*c* in response to a read request from the stream reading unit 300*c*. The stream read permission decision means 313 searches the apparatus type information Ity stored in the authorized apparatus type information storage means 312 for the value of the read apparatus type information Ity, and decides whether reading of the audio data stream Saf1 from the stream storage means 311 is to be permitted or not in accordance with the result of the search.

To be specific, the stream read permission decision means 313 permits the stream reading means 104 to read the audio data stream Saf1 when the value of the apparatus type information Ity read from the apparatus type information holding means 315 agrees with any of the values of the apparatus type information Ity stored in the authorized apparatus type information storage means 312. On the other hand, the stream read permission decision means 313 inhibits the stream reading means 104 from reading the audio data stream Saf1 when the value of the apparatus type information Ity read from the apparatus type information holding means 315 agrees with the values of the apparatus type information Ity stored in the authorized apparatus type information storage means 312.

For example, when the value of the apparatus type information Ity held by the apparatus type information holding means 315 is "1" (a recorder with the function of inserting a watermark at reproduction), since the value "1" of the apparatus type information Ity is stored in the authorized apparatus type information storage means 312 as shown in FIG. 7, reading of the audio data stream Saf1 is permitted. In this case, the stream reading means 104 can read the audio data stream Saf1 from the stream storage means 311.

On the other hand, when a value not shown in FIG. 7, "2", for example, is held in the apparatus type information holding means 315, or when the stream reading unit 300*c* does not have the apparatus type information holding means 315 and so the apparatus type information obtaining means 314 cannot obtain the value of the apparatus type information Ity, reading of the audio data stream Saf1 is inhibited. In this case, the stream reading means 104 cannot read the audio data stream Saf1 from the stream storage means 311.

In this third embodiment, since the stream storage unit 300*b* is constituted by an IC card as shown in FIG. 1, the stream storage means 311 and the authorized apparatus type information storage means 312 are implemented by a RAM mounted on the IC card. The stream read permission decision means 313 and the apparatus type information obtaining means 314 are implemented by a CPU mounted on the IC card.

Further, in many cases, the stream writing unit 300*a* is constructed as an apparatus for performing writing of the audio data stream into the stream storage unit 300*b*, while the stream reading unit 300*c* is constructed as another apparatus for performing reading of the audio data stream from the stream storage unit 300*b*.

Next, the operation of the data recording and reproduction apparatus 300 will be described.

The operation of writing the audio data stream into the IC card (recording medium) constituting the stream storage unit 300*b* is identical to that already described for the first embodiment and, therefore, this operation will be briefly described hereinafter.

In the stream attribute decision means 101, it is decided whether an audio data stream S supplied from an outside source is a compressed audio data stream ESau or a non-compressed audio data stream Sau, and attribute decision information Iaj1 indicating the result of the decision of whether the inputted audio stream S is compressed or not is output from the decision means 101. Thereafter, in the flag-attached stream writing means 102, a compression ID flag Fco is attached to the stream header Sh of the audio data stream S in accordance with the attribute decision information Iaj1, and the flag-attached audio data stream Saf1 (refer to FIG. 2(*b*)) is written in the stream storage unit 300*b* by the flag-attached stream writing means 102. In this third embodiment, the flag-attached audio data stream Saf1 is written in the stream storage means 311 of the stream storage unit 300*b*.

Next, the operation of reading the audio data stream from the stream storage unit 300*b* will be described.

Initially, a stream read request is output from the stream reading means 104 to the stream storage unit 300*b*. Then, the value of the apparatus type information Ity held by the apparatus type information holding means 315 in the stream reading unit 300c is read by the apparatus type information obtaining means 314 to be output to the stream read permission decision means 313.

In the stream read permission decision means 313, a search is carried out as to whether the value of the apparatus type information Ity which has been read is stored in the authorized apparatus type information storage means 312 or not. When the value of the read apparatus type information Ity is stored in the storage means 312, the permission decision means 313 decides that the stream reading means 104 is permitted to read the audio data stream. When the value of the read apparatus type information Ity is not stored in the storage means 312, the permission decision means 313 decides that the stream reading means 104 is inhibited from reading the audio data stream.

In other words, the audio data stream stored in the stream storage means 311 can be read by the stream reading means 104 only when the stream read permission decision means 313 decides that reading is permitted. Thereby, the audio data stream Saf1 is read from the stream storage means 311 by the stream reading means 104.

For example, when the value of the apparatus type information Ity held by the apparatus type information holding means 315 is "1" (a recorder with the function of inserting a watermark at reproduction), this value agrees with one of the plural values of the apparatus type information Ity stored in the authorized apparatus type information storage means 312. Therefore, in the stream read permission decision means 313, the same value as the value of the apparatus type information Ity read by the apparatus type information obtaining means 314 is detected from the authorized apparatus type information storage means 312. At this time, the stream read permission decision means 313 decides that reading is permitted, and this decision permits the stream reading means 104 to read the audio data stream from the stream storage means 311.

On the other hand, when a value other than the plural values of the apparatus type information Ity stored in the authorized apparatus type information storage means 312, "2", for example, is held by the apparatus type information holding means 315, the stream read permission decision means 313 decides that reading is inhibited. Further, when the stream reading unit 300c does not have the apparatus type holding means 315, which would cause the apparatus type information obtaining means 314 to be unable to obtain any value as the apparatus type information Ity, the stream read permission decision means 313 decides that reading is inhibited, and this decision disables the stream reading means 104 from reading the audio data stream from the stream storage means 311.

The purpose of deciding whether reading of the audio data stream is permitted or not (inhibited) by the stream read permission decision means 313 is to avoid the possibility that the audio data stream is undesirably read from the stream storage unit 300b by a reproduction apparatus which does not perform watermarking when reproducing the audio data stream, which would thereby result in the audio data stream being reproduced or copied without being subjected to watermarking in order to protect the copyright.

The audio data stream read from the stream storage unit 300b by the stream reading means 104 is subjected to watermarking in the same manner as described for the first embodiment, and the watermark-inserted audio data stream is converted to analog audio data Aaw.

In brief, the stream flag decision means 105 decides whether the read audio data stream Saf1 is compressed or not in accordance with the value of the compression ID flag Fco included in the audio data stream Saf1. The audio data stream Saf1 is decompressed by decoding in the decoding means 106 only when the audio data stream Saf1 is compressed, and the decompressed audio data stream RSaf1 is output to the watermarking means 107.

In the watermarking means 107, a watermark is inserted in the non-compressed data stream, i.e., the decompressed audio data stream RSaf1 output from the decoding means 106 or the audio data stream which has been decided as being not compressed by the stream flag decision means 105. Thereby, the audio data stream read from the stream storage unit 300b is in the copyright protected state. The watermark-inserted audio data stream Saw1 is converted to analog audio data Aaw by the DA conversion means 108, and the analog audio data Aaw is converted to human-perceivable audio by the speaker 20.

As described above, in the data recording and reproduction apparatus 300 of this third embodiment, the stream reading unit 300c includes the apparatus type information holding means 315 for holding the value of the apparatus type information Ity of this apparatus 300, and the stream storage unit 300b includes the authorized apparatus type information storage means 312 for storing the information indicating the types of apparatuses which are permitted to read the audio data stream. In the stream storage unit 300b, it is checked by a search as to whether the value of the apparatus type information Ity of this apparatus 300 is stored in the storage means 312 or not, and reading of the audio data stream is permitted or inhibited according to the result of the search. Therefore, in addition to the effects of the first embodiment, it is possible to prevent the situation where the audio data stream is undesirably read from the stream storage unit 300b by a reproduction apparatus which does not perform watermarking when reproducing the audio data stream, which would result in the audio data stream being reproduced or copied without being subjected to watermarking in order to protect the copyright.

Fourth Embodiment

Figure 8:
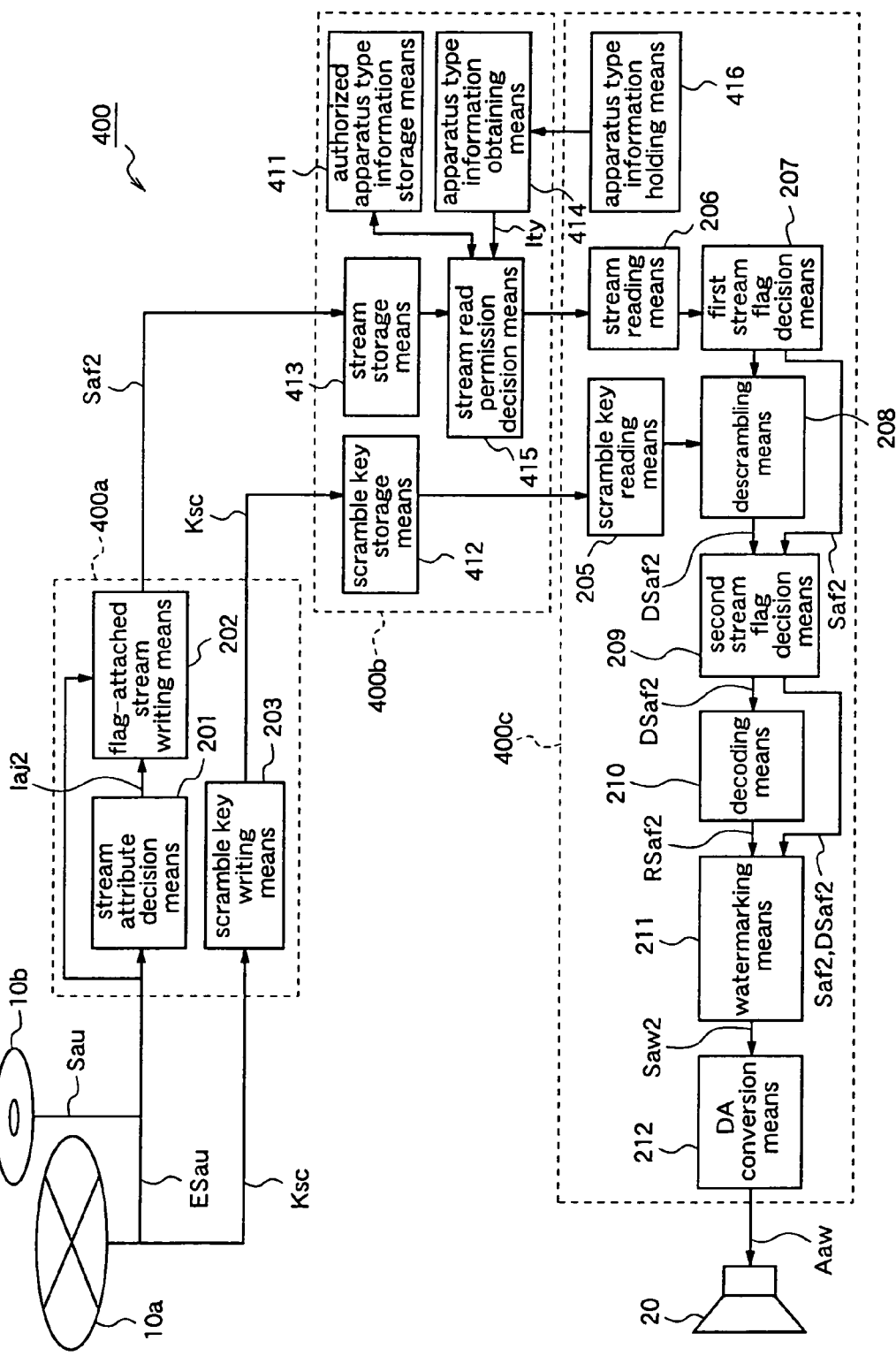
FIG. 8 is a block diagram for explaining a data recording and reproduction apparatus according to a fourth embodiment of the present invention.

FIG. 8 is a block diagram for explaining a data recording and reproduction apparatus 400 according to a fourth embodiment of the present invention.

The data recording and reproduction apparatus 400 is composed of a stream storage unit 400b for storing an audio data stream supplied from the outside, a stream writing unit 400a for writing the audio data stream into the stream storage unit 400b, and a stream reading unit 400c for reading the audio data stream from the stream storage unit 400b, like the data recording and reproduction apparatus 200 according to the second embodiment shown in FIG. 4.

The stream writing unit 400a and the stream reading unit 400c are mounted on the apparatus body (refer to FIG. 1). The stream storage unit 400b corresponds to the recording medium which is detachably mounted on the apparatus body, and the stream storage unit 400b is constituted by an IC card on which a semiconductor memory device (RAM) is mounted. The stream storage unit 400b is not restricted to an IC card type device and may be constituted by a memory stick type device.

Further, the audio data stream supplied from an outside source is a compressed audio data stream ESau, a non-compressed audio data stream Sau, or a scrambled compressed audio data stream ESau, as in the second embodiment of the invention. When the scrambled compressed audio data stream ESau is supplied, a scramble key Ksc for descrambling the supplied audio data stream is also supplied to the data recording and reproduction apparatus 400.

In this fourth embodiment, in order to simplify the description thereof, it is premised that a scrambled compressed audio data stream Esau, together with the corresponding scramble key, or a non-scrambled compressed audio data stream ESau is downloaded through a network 10a to the apparatus 200, while a non-scrambled, non-compressed audio data stream Sau is supplied from a portable recording medium 10b such as a CD to the apparatus 200. Further, each audio data stream has the data structure shown in FIG. 2(a).

Hereinafter, the constituents of the data recording and reproduction apparatus 400 will be described in detail.

The stream writing unit 400a is identical to the stream writing unit 200a of the second embodiment which includes the stream attribute decision means 201, the flag-attached stream writing means 202, and the scramble key writing means 203.

The stream reading unit 400c includes an apparatus type information holding means 416 for holding the value of information (apparatus type information Ity) which indicates the type of the data recording and reproduction apparatus 400 and the stream reading unit 400c includes the constituents of the stream reading unit 200c of the second embodiment. In the apparatus type information holding means 416, a predetermined value, for example, "1" or "0", is stored in advance as a value of the apparatus type information Ity. These values "1" and "0" of the apparatus type information Ity indicate the same contents as those of the third embodiment (refer to FIG. 7). That is, the value "0" of the apparatus type information Ity means that the corresponding data recording and reproduction apparatus is a player having the function of inserting a watermark at the time of reproduction. The value "1" of the apparatus type information Ity means that the corresponding data recording and reproduction apparatus is a recorder having the function of inserting a watermark at the time of reproduction.

The stream storage unit 400b includes a stream storage means 413, a scramble key storage means 412, and an authorized apparatus type information storage means 411. The stream storage means 413 stores the audio data stream Saf2 output from the flag-attached stream writing means 202. The scramble key storage means 412 stores the scramble key Ksc output from the scramble key writing means 203. The authorized apparatus type information storage means 411 stores the values of information (authorized apparatus type information Ity) indicating the types of apparatuses which are permitted to read the audio data stream Saf2 from the stream storage means 413.

The stream storage unit 400b further includes an apparatus type information obtaining means 414 and a stream read permission decision means 415. The apparatus type information obtaining means 414 reads the value of the apparatus type information Ity of the data recording and reproduction apparatus 400 from the apparatus type information storage means 416 of the stream reading unit 400c in accordance with a read request from the stream reading unit 400c. The stream read permission decision means 415 searches the values of the apparatus type information Ity stored in the authorized apparatus type information storage means 411 for the value of the apparatus type information Ity which has been read, and decides whether reading of the audio data stream from the stream storage means 413 is to be permitted or not according to the result of the search.

In the stream read permission decision means 415, the decision as to whether reading of the audio data stream is to be permitted or not is carried out in the same manner as described for the stream read permission decision means 313 of the third embodiment.

For example, when the value of the apparatus type information Ity held by the apparatus type information holding means 416 is "1" (a recorder with the function of inserting a watermark at reproduction), reading of the audio data stream is permitted since the value "1" of the apparatus type information Ity is stored in the authorized apparatus type information storage means 411 as shown in FIG. 7. On the other hand, when a value not shown in FIG. 7, for example, "2", is held in the apparatus type information holding means 416, or when the stream reading unit 400c does not have the apparatus type information holding means 416, which would cause the apparatus type information obtaining means 414 to be unable to obtain the value of the apparatus type information Ity, reading of the audio data stream is inhibited.

In this fourth embodiment, since the stream storage unit 400b is constituted by an IC card as shown in FIG. 1, the stream storage means 413, the scramble key storage means 412, and the authorized apparatus type information storage means 411 are implemented by a RAM mounted on the IC card. The stream read permission decision means 415 and the apparatus type information obtaining means 414 are implemented by a CPU mounted on the IC card.

Further, in many cases, the stream writing unit 400a is constructed as an apparatus for writing the audio data stream into the stream storage unit 400b, while the stream reading unit 400c is constructed as another apparatus for reading the audio data stream from the stream storage unit 400b.

Next, the operation of the data recording and reproduction apparatus 400 will be described.

Initially, the operation of writing the audio data stream into the IC card (recording medium) constituting the stream storage unit 400b is identical to that already described for the second embodiment and, therefore, this operation will be briefly described hereinafter.

The stream attribute decision means 201 decides whether the audio data stream S (Sau or ESau) supplied from the outside source is compressed or not and whether the audio data stream S is scrambled or not, and the stream attribute decision means 201 outputs the attribute decision information Iaj2 indicating the result of the decision. For example, as shown in FIG. 5, when the input audio data stream is compressed, "1" is set as the value of the compression ID flag Fco. When the input audio data stream is not compressed, "0" is set as the value of the compression ID flag Fco. When the input audio data stream is scrambled, "1" is set as the value of the scramble ID flag Fsc. When the input audio data stream is not scrambled, "0" is set as the value of the scramble ID flag Fsc.

In the flag-attached stream writing means 202, the compression ID flag Fco and the scramble ID flag Fsc are attached to the stream header Sh of the audio data stream S (refer to FIG. 5), and the flag-attached audio data stream Saf2 is written in the stream storage unit 400b by the writing means 202. In this fourth embodiment, the flag-attached audio data stream Saf2 is written in the stream storage means 413 of the stream storage unit 400b.

When the input audio data stream S is scrambled, simultaneously with writing the flag-attached audio data stream Saf2 into the stream storage means 413, a scramble key for descrambling the scrambled audio data stream is written in the scramble key storage means 412 by the scramble key writing means 203.

Next, the operation of reading the flag-attached audio data stream Saf2 from the stream storage unit 400b will be described.

Initially, a stream read request is output from the stream reading means 206 to the stream storage unit 400b. Then, the value of the apparatus type information Ity held by the apparatus type information holding means 416 of the stream reading unit 400c is read by the apparatus type information obtaining means 414 to be output to the stream read permission decision means 415.

Next, in the stream read permission decision means 415, it is decided whether reading of the audio data stream Saf2 is permitted or not, in the same manner as described for the stream read permission decision means 313 of the third embodiment. That is, in the stream read permission decision means 415, a search is carried out as to whether the value of the apparatus type information Ity which has been read is stored in the authorized apparatus type information storage means 411 or not. When the value of the read apparatus type information Ity is stored in the storage means 411, the stream read permission decision means 415 decides that the stream reading means 206 is permitted to read the audio data stream Saf2. However, when the value of the read apparatus type information Ity is not stored in the authorized apparatus type information storage means 411, the stream read permission decision means 415 decides that the stream reading means 206 is inhibited from reading the audio data stream Saf2.

In other words, the audio data stream stored in the stream storage means 413 can be read by the stream reading means 206 only when the stream read permission decision means 415 decides that reading is permitted. Thereby, the audio data stream Saf2 is read from the stream storage means 413 by the stream reading means 206.

Further, when the audio data stream Saf2 read from the stream storage means 413 is scrambled, the scramble key Ksc for descrambling the audio data stream is read from the scramble key storage means 412 by the scramble key reading means 205 of the stream reading unit 400c.

Thereafter, the audio data stream Saf2 read from the stream storage unit 400b by the stream reading means 206 is subjected to watermarking in the same manner as described for the second embodiment, and the watermark-inserted audio data stream is converted to analog audio data.

To be brief, in the first stream flag decision means 207, it is decided whether the audio data stream is scrambled or not in accordance with the value of the scramble ID flag Fsc included in the read audio data stream Saf2. The audio data stream is descrambled in the descrambling means 208 by using the scramble key Ksc read by the scramble key reading means 205 only when the audio data stream Saf2 is scrambled.

Next, in the second stream flag decision means 209, it is decided whether the descrambled audio data stream DSaf2 output from the descrambling means 208 or the non-scrambled audio data stream Saf2 output from the first stream flag decision means 207 is compressed or not according to the value of the compression ID flag Fco included in the audio data stream DSaf2 or Saf2.

The audio data stream is decompressed by decoding in the decoding means 210 only when the audio data stream DSaf2 or Saf2 is compressed, and the decompressed audio data stream RSaf2 is output to the watermarking means 211.

In the watermarking means 211, a watermark is inserted in the non-compressed audio data stream, i.e., the decompressed audio data stream RSaf2 output from the decoding means 210, or the audio data stream DSaf2 or Saf2 which has been decided as being not compressed by the second stream flag decision means 209. Thereby, the audio data stream read from the stream storage unit 400b is in the copyright protected state. The watermark-inserted audio data stream Saw2 is converted to analog audio data Aaw by the DA conversion means 212, and the analog audio data Aaw is converted by the speaker 20 to human-perceivable audio.

As described above, in the data recording and reproduction apparatus 400 of this fourth embodiment, in addition to the constituents of the data recording and reproduction apparatus 200 of the second embodiment, the stream reading unit 400c includes the apparatus type information holding means 416 for holding the value of the apparatus type information Ity of this data recording and reproduction apparatus 400, and the stream storage unit 400b includes the authorized apparatus type information storage means 411 for storing the information indicating the types of apparatuses which are permitted to read the audio data stream. In the stream storage unit 400b, it is checked by a search as to whether the value of the apparatus type information Ity of this data recording and reproduction apparatus 400 is stored in the authorized apparatus type information storage means 411 or not, and reading of the audio data stream is permitted or inhibited according to the result of the search. Therefore, in addition to the effects of the first embodiment, the audio data stream is prevented from being undesirably read from the stream storage unit 400b by a reproduction apparatus which does not perform watermarking when reproducing the audio data stream, and therefore audio data stream is prevented from being reproduced or copied without being subjected to watermarking in order to protect the copyright.

Fifth Embodiment

Figure 9:
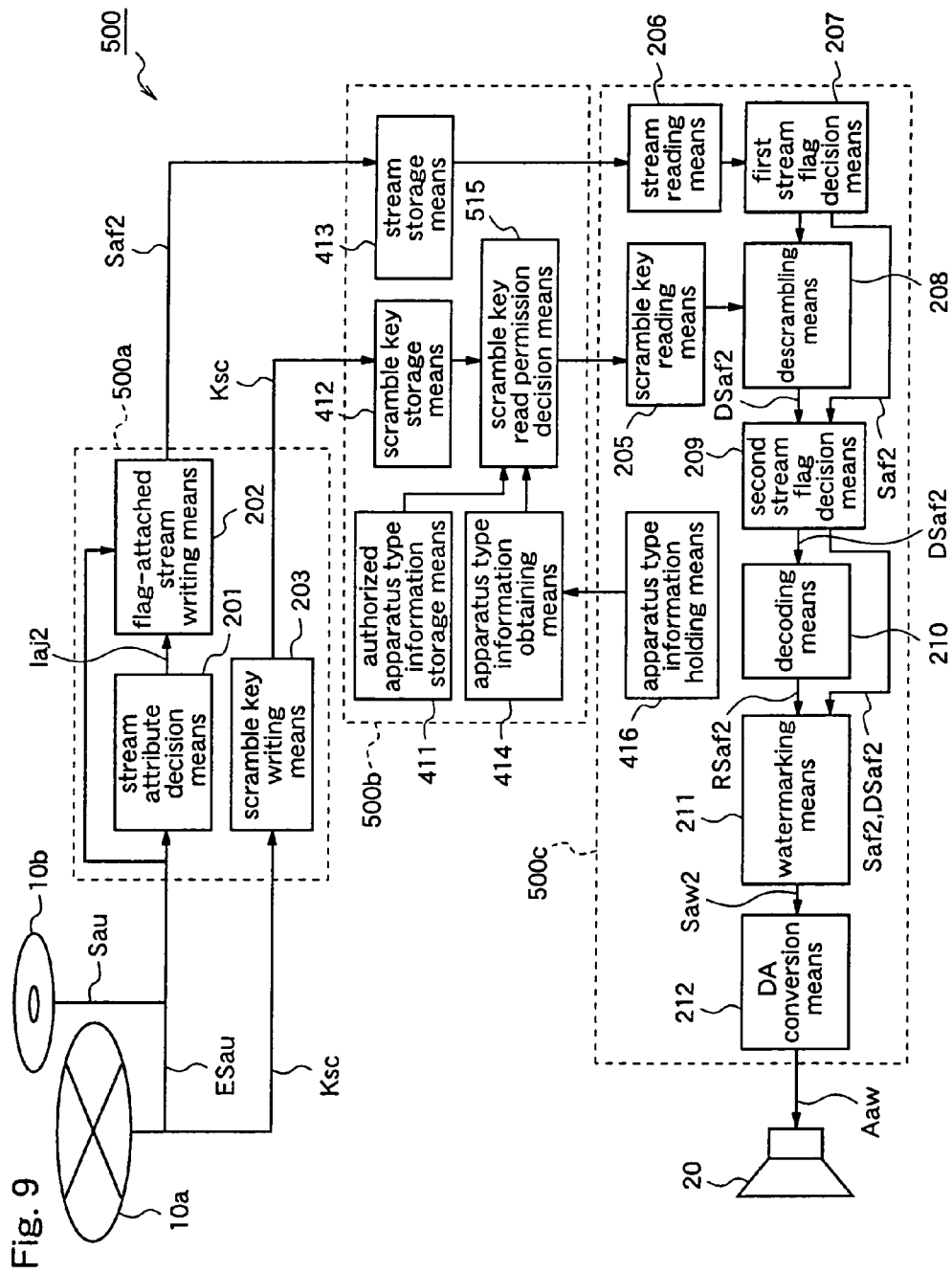
FIG. 9 is a block diagram for explaining a data recording and reproduction apparatus according to a fifth embodiment of the present invention.

FIG. 9 is a block diagram for explaining a data recording and reproduction apparatus 500 according to a fifth embodiment of the present invention.

The data recording and reproduction apparatus 500 is composed of a stream storage unit 500b for storing an audio data stream supplied from an outside source, a stream writing unit 500a for writing the supplied audio data stream into the stream storage unit 500b, and a stream reading unit 500c for reading the supplied audio data stream from the stream storage unit 500b similar to the data recording and reproduction apparatus 400 according to the fourth embodiment shown in FIG. 8.

The stream writing unit 500a and the stream reading unit 500c are identical to the stream writing unit 400a and the stream reading unit 400c, respectively, according to the fourth embodiment.

The stream storage unit 500b includes a scramble key read permission decision means 515 instead of the stream read permission decision means 415 of the stream storage unit 400b according to the fourth embodiment.

To be specific, the stream storage unit 500b includes a stream storage means 413, a scramble key storage means 412, and an authorized apparatus type information storage means 411. The stream storage means 413 stores the audio data stream Saf2 output from the flag-attached stream writing means 202. The scramble key storage means 412 stores the scramble key Ksc output from the scramble key writing means 203. The authorized apparatus type information storage means 411 stores the values of information (authorized apparatus type information Ity) indicating the types of apparatuses which are permitted to read the audio data stream Saf2 from the stream storage means 413.

The stream storage unit 500b further includes an apparatus type information obtaining means 414 and a scramble key read permission decision means 515. The apparatus type information obtaining means 414 reads the value of the apparatus type information Ity of the data recording and reproduction apparatus 500 from the apparatus type information storage means 416 of the stream reading unit 500c in accordance with a read request output from the stream reading unit 500c. The scramble key read permission decision means 515 searches the values of the apparatus type information Ity stored in the authorized apparatus type information storage means 411 for the value of the apparatus type information Ity which has been read, and decides whether reading of the scramble key Ksc from the scramble key storage means 412 is to be permitted or not according to the result of the search.

In the scramble key read permission decision means 515, the decision as to whether reading of the scramble key Ksc is to be permitted or not is carried out in the same manner as described for the stream read permission decision means 415 of the fourth embodiment.

For example, when the value of the apparatus type information Ity held by the apparatus type information holding means 416 is "1" (a recorder with the function of inserting a watermark at reproduction), reading of the scramble key is permitted since the value "1" of the apparatus type information Ity is stored in the authorized apparatus type information storage means 411 as shown in FIG. 7. On the other hand, when a value not shown in FIG. 7, for example, "2", is held in the apparatus type information holding means 416, or when the stream reading unit 500c does not have the apparatus type information holding means 416, which would cause the apparatus type information obtaining means 414 to be unable to obtain the value of the apparatus type information Ity, reading of the scramble key is inhibited.

In this fifth embodiment, since the stream storage unit 500b is constituted by an IC card as shown in FIG. 1, the stream storage means 413, the scramble key storage means 412, and the authorized apparatus type information storage means 411 are implemented by a RAM mounted on the IC card. The scramble key read permission decision means 515 and the apparatus type information obtaining means 414 are implemented by a CPU mounted on the IC card.

Further, in many cases, the stream writing unit 500a is constructed as an apparatus for writing the audio data stream into the stream storage unit 500b, while the stream reading unit 500c is constructed as another apparatus for reading the audio data stream from the stream storage unit 500b.

Next, the operation of the data recording and reproduction apparatus 500 will be described.

Initially, the operation of writing the audio data stream into the IC card (recording medium) constituting the stream storage unit 500b is identical to that already described for the fourth embodiment.

That is, the stream attribute decision means 201 decides whether the audio data stream S supplied from the outside is compressed or not and whether the audio data stream is scrambled or not, and the stream attribute decision means 201 outputs attribute decision information Iaj2 indicating the result of the decision.

In the flag-attached stream writing means 202, a compression ID flag Fco and a scramble ID flag Fsc are attached to the stream header Sh of the audio data stream S (refer to FIG. 5) in accordance with the attribute decision information Iaf2, and the flag-attached audio data stream Saf2 is written in the stream storage unit 500b by the flag-attached stream writing means 202. In this fifth embodiment, the flag-attached audio data stream Saf2 is written in the stream storage means 413 of the stream storage unit 500b.

When the input audio data stream S is scrambled, simultaneously with writing the flag-attached audio data stream in the stream storage means 413, a scramble key Ksc for descrambling the scrambled audio data stream is written in the scramble key storage means 412 by the scramble key writing means 203.

Next, the operation of reading the audio data stream Saf2 from the stream storage unit 500b will be described.

Initially, a stream read request is output from the stream reading means 206 to the stream storage unit 500b. Then, the value of the apparatus type information Ity held by the apparatus type information holding means 416 of the stream reading unit 500c is read by the apparatus type information obtaining means 414 to be output to the scramble key read permission decision means 515.

In the scramble key read permission decision means 515, a decision as to whether reading of the scramble key Ksc is permitted or not is carried out in the same manner as the decision by the stream read permission decision means 415 of the fourth embodiment. That is, in this scramble key read permission decision means 515, a search is performed as to whether the value of the read apparatus type information Ity which has been read is stored in the authorized apparatus type information storage means 411 or not. When the value of the read apparatus type information Ity is stored in the storage means 411, the permission decision means 515 decides that the scramble key reading means 205 is permitted to read the scramble key Ksc. When the value of the read apparatus type information Ity is not stored in the storage means 411, the scramble key read permission decision means 515 decides that the scramble key reading means 205 is inhibited from reading the scramble key.

In other words, the scramble key Ksc stored in the scramble key storage means 412 can be read by the scramble key reading means 205 only when the scramble key read permission decision means 515 decides that reading is permitted. Thereby, the scramble key Ksc is read from the scramble key storage means 412 by the scramble key reading means 205.

The audio data stream Saf2 is read from the stream storage means 413 by the stream reading means 206 and is output to the first stream flag decision means 207.

Thereafter, the audio data stream read from the stream storage unit 500b by the stream reading means 206 is subjected to watermarking in the same manner as described for the fourth embodiment, and the watermark-inserted audio data stream is converted to analog audio data.

To be brief, in the first stream flag decision means 207, it is decided whether the audio data stream is scrambled or not in accordance with the value of the scramble ID flag Fsc included in the read audio data stream Saf2. The audio data stream is descrambled in the descrambling means 208 by using the scramble key Ksc read by the scramble key reading means 205 only when the audio data stream Saf2 is scrambled.

Next, in the second stream flag decision means 209, it is decided whether the descrambled audio data stream DSaf2 output from the descrambling means 208 or the non-scrambled audio data stream Saf2 output from the first stream flag decision means 207 is compressed or not according to the value of the compression ID flag Fco included in the audio data stream DSaf2 or Saf2.

The audio data stream is decompressed by decoding in the decoding means 210 only when the audio data stream DSaf2 or Saf2 is compressed, and the decompressed audio data stream RSaf2 is output to the watermarking means 211.

In the watermarking means 211, a watermark is inserted in the non-compressed audio data stream, i.e., the decompressed audio data stream RSaf2 output from the decoding means 210, or the audio data stream DSaf2 or Saf2 which has been decided as being not compressed by the second stream flag decision means 209. Thereby, the audio data stream read from the stream storage unit 500b is in the copyright protected state. The watermark-inserted audio data stream Saw2 is converted to analog audio data Aaw by the DA conversion means 212, and the analog audio data Aaw is converted to human-perceivable audio by the speaker 20.

As described above, in the data recording and reproduction apparatus 500 of this fifth embodiment, in addition to the constituents of the data recording and reproduction apparatus 200 of the second embodiment, the stream reading unit 500c includes the apparatus type information holding means 416 for holding the value of the apparatus type information Ity of this data recording and reproduction apparatus 500, and the stream storage unit 500b includes the authorized apparatus type information storage means 411 for storing the information indicating the types of apparatuses which are permitted to read the audio data stream. In the stream storage unit 500b, it is checked by a search as to whether the value of the apparatus type information Ity of this data recording and reproduction apparatus 500 is stored in the storage means 411 or not, and reading of the audio data stream is permitted or inhibited according to the result of the search. Therefore, in addition to the effects of the second embodiment, the scrambled audio data stream read from the stream storage unit 500c is prevented from being undesirably decrypted by a reproduction apparatus which does not perform watermarking when reproducing the audio data stream and therefore the audio data stream is prevented from being reproduced or copied without being subjected to watermarking in order to protect the copyright.

In other words, the scramble key stored in the scramble key storage means 412 is prevented from being read by an audio data stream recording and reproduction apparatus having no watermarking means. Therefore, even if the audio data stream is read by such an apparatus, the apparatus cannot descramble the audio data stream, thereby preventing the audio data stream from being reproduced or copied without being subjected to watermarking.

In the aforementioned embodiments of the present invention, emphasis has been placed on a data recording and reproduction apparatus in which a recording medium (stream storage unit) detachably mounted on the body of the apparatus is implemented by an IC card using a semiconductor memory device as its main component. However, the detachable recording medium (stream storage unit) is not restricted thereto.

Figure 10:
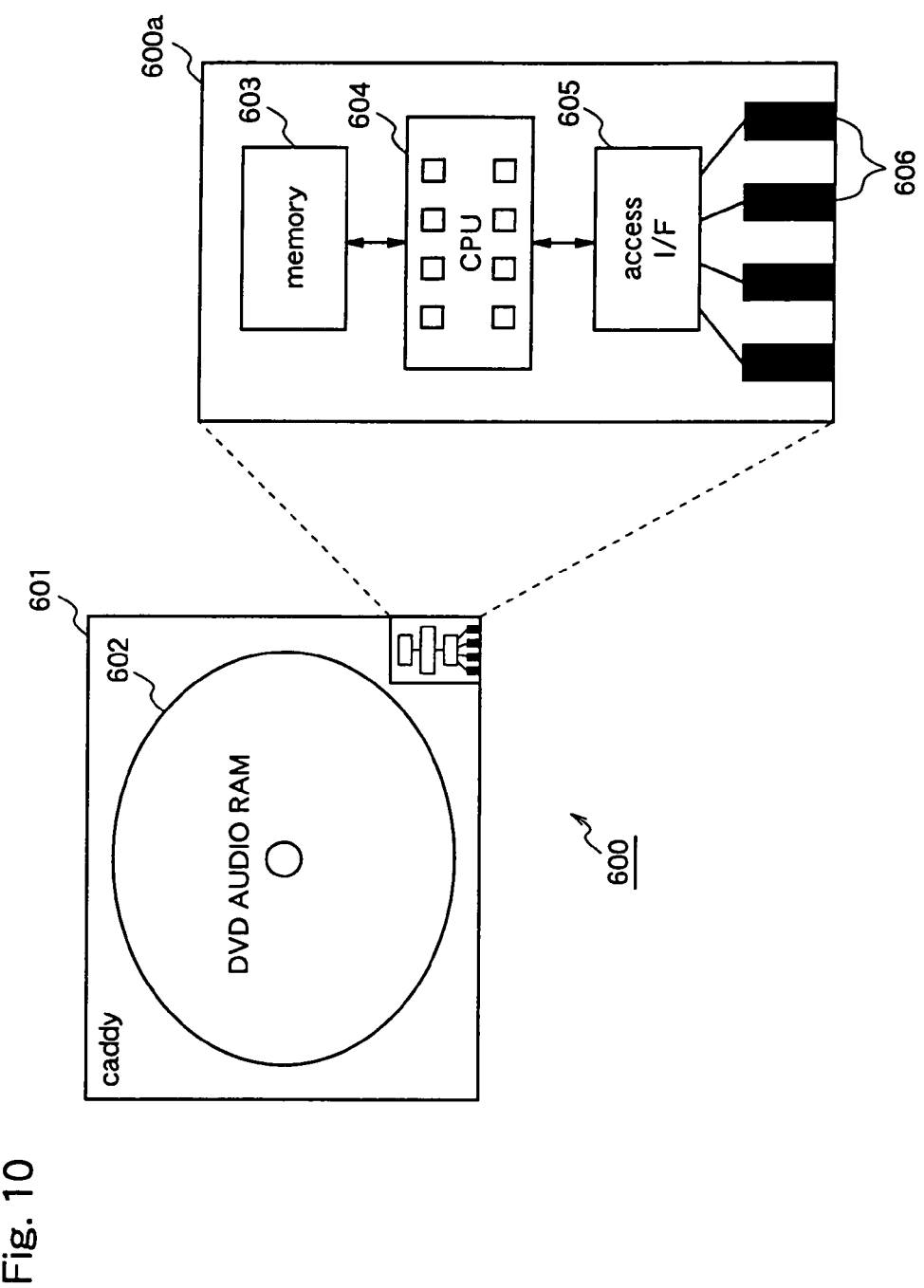
FIG. 10 is a diagram illustrating another example of a detachable recording medium which constitutes a stream storage unit according to any of the aforementioned embodiments.
Figure 11:
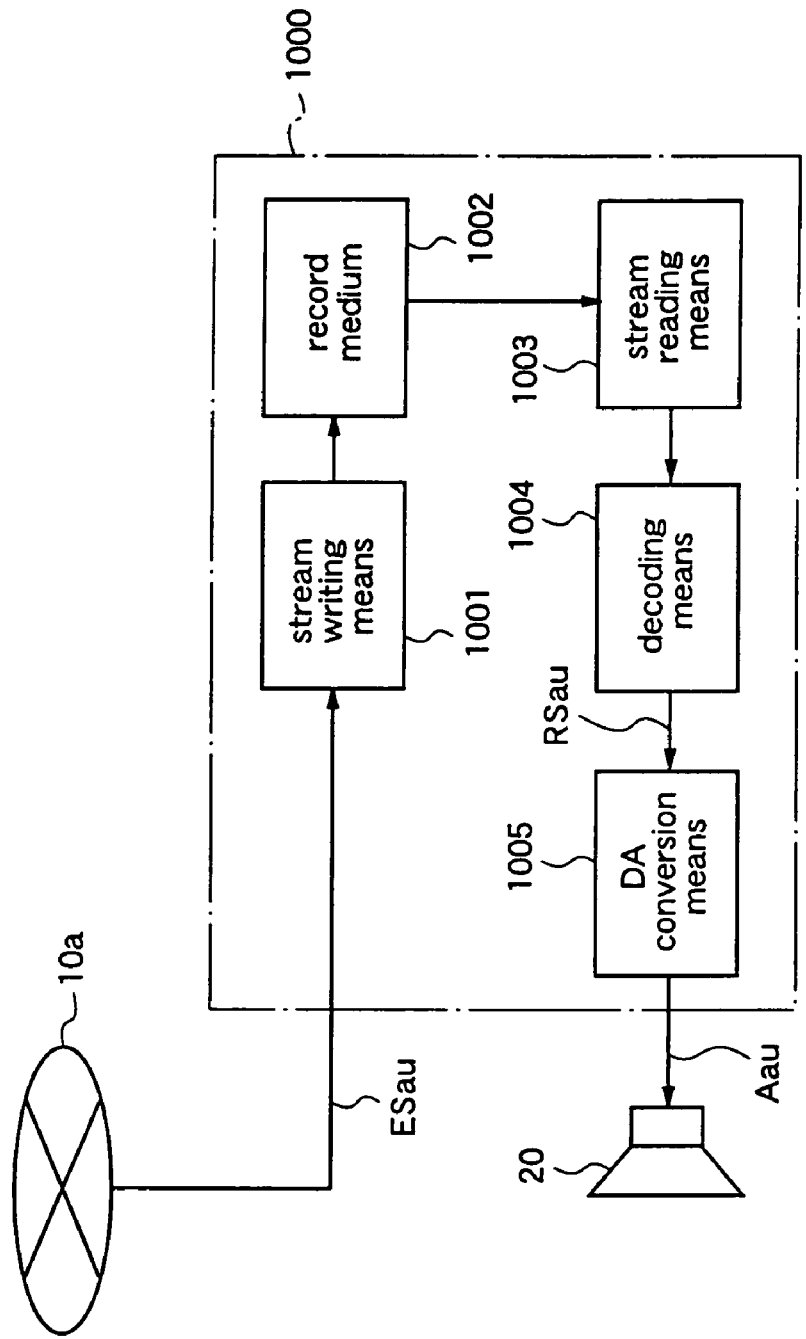
FIG. 11 is a block diagram illustrating the structure of a conventional PC which performs downloading and reproduction of audio data.

For example, the recording medium may be a rewritable disk unit 600 as shown in FIG. 10. This disk unit 600 comprises a digital audio data rewritable disk 602 (e.g., DVD AUDIO RAM), a caddy 601 containing the disk 602, and a control unit 600a placed inside the caddy 601. The control unit 600a comprises a unit-side access terminal 606 connected to an access terminal on the unit body side, a CPU 604 for controlling data access between the unit body and the disk 602, a memory 603 for storing data processed by the CPU 604, and an access I/F 605 placed between the CPU 604 and the unit-side access terminal 606.

What is claimed is:

1. A data recording and reproduction apparatus into which a first audio data stream which has been subjected to a data conversion process for digital audio data and a second audio data stream which has not been subjected to the data conversion process for digital audio data are inputted, and which records and reproduces each inputted audio data stream, wherein the data conversion process causes the first audio data stream to become a stream which is unsuitable for watermark insertion, said apparatus comprising:

a stream storage unit for storing each of the first and second audio data streams;

a stream writing unit for writing each of the first and second audio data streams into said stream storage unit; and a stream reading unit for reading each audio data stream from said stream storage unit, for inserting a watermark into each read audio data stream, and for outputting a watermark-inserted audio data stream for each read audio data stream;

said stream writing unit comprising stream attribute decision means for deciding whether or not each audio data stream has been subjected to the data conversion process for digital audio data, and stream writing means for attaching a respective conversion ID flag having a value indicating the result of the decision of said stream attribute decision means to each audio data stream, and for writing a flag-attached audio data stream for each audio data stream into said stream storage unit; and said stream reading unit comprising stream reading means for reading the flag-attached audio data stream from said stream storage unit, data converting means for subjecting the read flag-attached audio data stream to an inverse conversion process which is inverse to the data conversion process that the read flag-attached audio data stream has been subjected to when the conversion ID flag of the read flag-attached audio data stream indicates that the read flag-attached audio data stream is a stream which has been subjected to the data conversion process and outputting the read flag-attached audio data stream after being subjected to the inverse conversion process, and for outputting the read flag-attached audio data stream without performing the inverse conversion process when the conversion ID flag of the read flag-attached audio data stream indicates that the read flag-attached audio data stream is a stream which has not been subjected to the data conversion process, and watermarking means for inserting a watermark in the flag-attached audio data stream which is outputted by said data converting means.

2. The data recording and reproduction apparatus according to claim 1, wherein said stream reading unit further comprises DA conversion means for converting the flag-attached audio data stream in which the watermark is inserted by said watermarking means to analog audio data, and for outputting the analog audio data.

3. The data recording and reproduction apparatus according to claim 1, wherein:

the data conversion process performed on the digital audio data is a data compression process for compressing the digital audio data by coding;

the inverse conversion process is a decompression process for decompressing compressed digital audio data by decoding; and said stream writing means attaches a respective compression ID flag to each audio data stream as the conversion ID flag having a value indicating the result of the decision of said stream attribute decision means, the compression ID flag indicating whether or not each audio data stream has been subjected to the data compression process.

4. The data recording and reproduction apparatus according to claim 3, wherein said stream reading unit further comprises:
stream flag decision means for deciding whether or not the flag-attached audio data stream read from said stream storage unit has been subjected to the data compression process according to the compression ID flag of the read flag-attached audio data stream; and
decoding means for decompressing, by decoding, the flag-attached audio data stream which is decided as being subjected to the data compression process by said stream flag decision means, and for outputting a decompressed audio data stream, and
wherein the flag-attached audio data stream which is decided as being not subjected to the data compression process by said stream flag decision means and the decompressed audio data stream output from said decoding means are supplied to said watermarking means.

5. The data recording and reproduction apparatus according to claim 3, wherein said stream reading unit further comprises DA conversion means for converting the flag-attached audio data stream in which the watermark is inserted by said watermarking means to analog audio data, and for outputting the analog audio data.

6. The data recording and reproduction apparatus according to claim 1, wherein:
the data conversion process performed on the digital audio data includes at least one of a data compression process for compressing digital audio data by coding and a scramble process for scrambling digital audio data or compressed digital audio data;
the inverse conversion process includes at least one of a decompression process for decompressing compressed digital audio data by decoding and a descramble process for descrambling scrambled digital audio data or scrambled compressed digital audio data; and
said stream writing means attaches a respective compression ID flag and a respective scramble ID flag to each audio data stream as the conversion ID flag having a value corresponding to the result of the decision of said stream attribute decision means, the compression ID flag indicating whether or not each audio data stream has been subjected to the data compression process, and the scramble ID flag indicating whether or not each audio data stream or a compressed audio data stream has been subjected to the scramble process.

7. The data recording and reproduction apparatus according to claim 6, wherein said stream writing unit further comprises scramble key writing means for writing a scramble key respectively adapted to each audio data stream which has been subjected to the scramble process into said stream storage unit, and
wherein said stream reading unit further comprises:
scramble key reading means for reading the scramble key respectively adapted to each audio data stream which has been subjected to the scramble process from said stream storage unit;
first stream flag decision means for deciding whether or not the flag-attached audio data stream read from said stream storage unit has been subjected to the scramble process according to the scramble ID flag of the read flag-attached audio data stream;
descrambling means for descrambling, by using the scramble key, the flag-attached audio data stream which is decided as being scrambled by said first stream flag decision means, and for outputting a descrambled audio data stream;
second stream flag decision means for deciding whether or not the flag-attached audio data stream which is decided as being not scrambled by said first stream flag decision means and the descrambled audio data stream output from said descrambling means have been subjected to the data compression process according to their respective compression ID flags; and
decoding means for decompressing, by decoding, the flag-attached audio data stream which is decided as being compressed by said second stream flag decision means, and for outputting a decompressed audio data stream, and
wherein the flag-attached audio data stream which is decided as being not scrambled by said first stream flag decision means and the descrambled audio data stream output from said descrambling means are supplied to said second stream flag decision means, while the flag-attached audio data stream which is decided as being not compressed by said second stream flag decision means and the decompressed audio data stream output from said decoding means are supplied to said watermarking means.

8. The data recording and reproduction apparatus according to claim 6, wherein said stream reading unit further comprises DA conversion means for converting the flag-attached audio data stream in which the watermark is inserted by said watermarking means to analog audio data, and for outputting the analog audio data.

9. The data recording and reproduction apparatus according to claim 1, wherein said stream reading unit is constituted by a single apparatus for reproducing a data stream which is separate from said writing unit and said storage unit, and said single apparatus comprises apparatus type information holding means for holding apparatus type information which indicates a type of said single apparatus, and
wherein said stream storage unit comprises:
stream storage means for storing the flag-attached audio data stream output from said stream writing means;
authorized apparatus type information storage means for storing authorized apparatus type information indicating stream reproduction apparatuses which are permitted to read the flag-attached audio data stream from said stream storage means;
apparatus type information obtaining means for obtaining the apparatus type information held by said apparatus type information holding means; and
stream read permission decision means for searching said authorized apparatus type information storage means for the apparatus type information obtained by said apparatus type information obtaining means, and for permitting said stream reading means to read the flag-attached audio data stream from said stream storage means only when an authorized apparatus type information corresponding to the obtained apparatus type information is present.

10. The data recording and reproduction apparatus according to claim 4, wherein said stream reading unit is constituted by a single apparatus for reproducing a data stream which is separate from said writing unit and said storage unit, and said single apparatus comprises apparatus type information holding means for holding apparatus type information indicating a type of said single apparatus, and wherein said stream storage unit comprises:
stream storage means for storing the flag-attached audio data stream output from said stream writing means;
authorized apparatus type information storage means for storing authorized apparatus type information indicating stream reproduction apparatuses which are permitted to read the flag-attached audio data stream from said stream storage means;
apparatus type information obtaining means for obtaining the apparatus type information held by said apparatus type information holding means; and
stream read permission decision means for searching said authorized apparatus type information storage means for the apparatus type information obtained by said apparatus type information obtaining means, and for permitting said stream reading means to read the flag-attached audio data stream from said stream storage means only when an authorized apparatus type information corresponding to the obtained apparatus type information is present.

11. The data recording and reproduction apparatus according to claim 7, wherein said stream reading unit is constituted by a single apparatus for reproducing a data stream which is separate from said writing unit and said storage unit, and said single apparatus comprises apparatus type information holding means for holding apparatus type information indicating a type of said single apparatus, and wherein said stream storage unit comprises:
stream storage means for storing the flag-attached audio data stream output from said stream writing means;
scramble key storage means for storing the scramble key output from said scramble key writing means;
authorized apparatus type information storage means for storing authorized apparatus type information indicating stream reproduction apparatuses which are permitted to read the flag-attached audio data stream from said stream storage means;
apparatus type information obtaining means for obtaining the apparatus type information held by said apparatus type information holding means; and
stream read permission decision means for searching said authorized apparatus type information storage means for the apparatus type information obtained by said apparatus type information obtaining means, and for permitting said stream reading means to read the flag-attached audio data stream from said stream storage means only when an authorized apparatus type information corresponding to the obtained apparatus type information is present.

12. The data recording and reproduction apparatus according to claim 7, wherein said stream reading unit is constituted by a single apparatus for reproducing a data stream which is separate from said writing unit and said storage unit, and said single apparatus comprises apparatus type information holding means for holding apparatus type information indicating a type of said single apparatus, and wherein said stream storage unit comprises:
stream storage means for storing the flag-attached audio data stream output from said stream writing means;
scramble key storage means for storing the scramble key output from said scramble key writing means;
authorized apparatus type information storage means for holding authorized apparatus type information indicating stream reproduction apparatuses which are authorized to read the flag-attached audio data stream from said stream storage means;
apparatus type information obtaining means for obtaining the apparatus type information held by said apparatus type information holding means; and
scramble key read permission decision means for searching the authorized apparatus type information storage means for the apparatus type information obtained by said apparatus type information obtaining means, and for permitting said scramble key reading means to read the scramble key from said scramble key storage means only when an authorized apparatus type information corresponding to the obtained apparatus type information is present.

13. The data recording and reproduction apparatus according to claim 1, wherein said stream storage unit is implemented by an IC card on which a RAM for storing an audio data stream and a CPU for controlling access to the audio data stream stored in said RAM are mounted thereon.

14. The data recording and reproduction apparatus according to claim 9, wherein:
said stream storage unit is implemented by an IC card on which a RAM for storing an audio data stream and a CPU for controlling access to the audio data stream stored in said RAM are mounted thereon;
said stream storage means and said authorized apparatus type information storage means are implemented by said RAM; and
said apparatus type information obtaining means and said stream read permission decision means are implemented by said CPU.

15. The data recording and reproduction apparatus according to claim 11, wherein:
said stream storage unit is implemented by an IC card on which a RAM for storing an audio data stream and a CPU for controlling access to the audio data stream stored in said RAM are mounted thereon;
said stream storage means, said scramble key storage means, and said authorized apparatus type information storage means are implemented by said RAM; and
said apparatus type information obtaining means and said stream read permission decision means are implemented by said CPU.

16. The data recording and reproduction apparatus according to claim 12, wherein:
said stream storage unit is implemented by an IC card on which a RAM for storing an audio data stream and a CPU for controlling access to the audio data stream stored in said RAM are mounted thereon;
said stream storage means, said scramble key storage means, and said authorized apparatus type information storage means are implemented by said RAM; and
said apparatus type information obtaining means and said scramble key read permission decision means are implemented by said CPU.

17. A data recording and reproduction apparatus into which a first audio data stream which has been subjected to a data conversion process for digital audio data and a second audio data stream which has not been subjected to the data conversion process for digital audio data are inputted, and which records and reproduces each inputted audio data stream, wherein the data conversion process causes the first audio data stream to become a stream which is unsuitable for watermark insertion, said apparatus comprising:
- a stream storage unit for storing each of the first and second audio data streams;
- a stream writing unit for writing each of the first and second audio data streams into said stream storage unit; and
- a stream reading unit for reading each audio data stream from said storage unit, for inserting a watermark into each read audio data stream, and for outputting a watermark-inserted audio data stream for each read audio data stream;

said stream writing unit comprising
- a stream attribute decision unit operable to decide whether or not each audio data stream has been subjected to the data conversion process for digital audio data, and
- a writing and attaching unit operable to attach a respective conversion ID flag having a value indicating the result of the decision of said stream attribute and decision unit to each audio data stream, and to write a flag-attached audio data stream for each audio data stream into said stream storage unit; and said stream reading unit comprising
- a reading unit operable to read the flag-attached audio data stream from said stream storage unit,
- a data converting unit operable to subject the read flag-attached audio data stream to an inverse conversion process which is inverse to the data conversion process that the read flag-attached audio data stream has been subjected to when the conversion ID flag of the read flag-attached audio data stream indicates that the read flag-attached audio data stream is a stream which has been subjected to the data conversion process and to output the read flag-attached audio data stream after being subjected to the inverse conversion process, and to output the read flag-attached audio data stream without performing the inverse conversion process when the conversion ID flag of the read flag-attached audio data stream indicates that the read flag-attached audio data stream is a stream which has not been subjected to the data conversion process, and
- a watermarking unit operable to insert a watermark in the flag-attached audio data stream which is outputted by said data converting unit.

18. The data recording and reproduction apparatus according to claim 17, wherein said stream reading unit further comprises a DA conversion unit operable to convert the flag-attached audio data stream in which the watermark is inserted by said watermarking unit to analog audio data, and to output the analog audio data.

19. The data recording and reproduction apparatus according to claim 17, wherein:
- the data conversion process performed on the digital audio data is a data compression process for compressing the digital audio data by coding;
- the inverse conversion process is a decompression process for decompressing compressed digital audio data by decoding; and
- said writing and attaching unit is operable to attach a respective compression ID flag to each audio data stream as the conversion ID flag having a value indicating the result of the decision of said stream attribute decision unit, the compression ID flag indicating whether or not each audio data stream has been subjected to the data compression process.

20. The data recording and reproduction apparatus according to claim 19, wherein said stream reading unit further comprises:
- a stream flag decision unit operable to decide whether or not the flag-attached audio data stream read from said stream storage unit has been subjected to the data compression process according to the compression ID flag of the read flag-attached audio data stream; and
- a decoding unit operable to decompress, by decoding, the flag-attached audio data stream which is decided as being subjected to the data compression process by said stream flag decision unit, and to output a decompressed audio data stream;
- wherein the flag-attached audio data stream which is decided as being not subjected to the data compression process by said stream flag decision unit, and the decompressed audio data stream output from said decoding unit are supplied to said watermarking unit.

21. The data recording and reproduction apparatus according to claim 19, wherein said stream reading unit further comprises a DA conversion unit operable to convert the audio data stream in which the watermark is inserted by said watermarking unit to analog audio data, and to output the analog audio data.

22. The data recording and reproduction apparatus according to claim 17, wherein:
- the data conversion process performed on the digital audio data includes at least one of a data compression process for compressing digital audio data by coding and a scramble process for scrambling digital audio data or compressed digital audio data;
- the inverse conversion process includes at least one of a decompression process for decompressing compressed digital audio data by decoding and a descramble process for descrambling scrambled digital audio data or scrambled compressed digital audio data; and
- said writing and attaching unit is operable to attach a respective compression ID flag and a respective scramble ID flag to each audio data stream as the conversion ID flag having a value corresponding to the result of the decision of said stream attribute decision unit, the compression ID flag indicating whether or not each audio data stream has been subjected to the data compression process, and the scramble ID flag indicating whether or not each audio data stream or a compressed audio data stream has been subjected to the scramble process.

23. The data recording and reproduction apparatus according to claim 22, wherein said stream writing unit further comprises a scramble key writing unit operable to write a scramble key respectively adapted to each audio data stream which has been subjected to the scramble process into said stream storage unit, and
wherein said stream reading unit further comprises:
- a scramble key reading unit operable to read the scramble key respectively adapted to each audio data stream which has been subjected to the scramble process from said stream storage unit;
- a first stream flag decision unit operable to decide whether or not the flag-attached audio data stream read from said stream storage unit has been subjected to the scramble process according to the scramble ID flag of the read flag-attached audio data stream;

a descrambling unit operable to descramble, by using the scramble key, the flag-attached audio data stream which is decided as being scrambled by said first stream flag decision means, and to output a descrambled audio data stream;

a second stream flag decision unit operable to decide whether or not the flag-attached audio data stream which is decided as being not scrambled by said first stream flag decision unit and the descrambled audio data stream output from said descrambling unit have been subjected to the data compression process according to their respective compression ID flags; and a decoding unit operable to decompress, by decoding, the flag-attached audio data stream which is decided as being compressed by said second stream flag decision unit, and to output a decompressed audio data stream; and wherein the flag-attached audio data stream which is decided as being not scrambled by said first stream flag decision unit and the descrambled audio data stream output from said descrambling unit are supplied to said second stream flag decision unit, while the flag-attached audio data stream which is decided as being not compressed by said second stream flag decision unit and the decompressed audio data stream output from said decoding unit are supplied to said watermarking unit.

24. The data recording and reproduction apparatus according to claim 22, wherein said stream reading unit further comprises a DA conversion unit operable to convert the audio data stream in which the watermark is inserted by said watermarking unit to analog audio data, and to output the analog audio data.

25. The data recording and reproduction apparatus according to claim 17, wherein said stream reading unit is constituted by a single apparatus for reproducing a data stream which is separate from said writing unit and said storage unit, and said single apparatus comprises an apparatus type information holding unit operable to hold apparatus type information which indicates a type of said single apparatus, and wherein said stream storage unit comprises:
a storage device operable to store the flag-attached audio data stream output from said writing and attaching unit;
an authorized apparatus type information storage unit operable to store authorized apparatus type information indicating stream reproduction apparatuses which are permitted to read the flag-attached audio data stream from said storage device;
an apparatus type information obtaining unit operable to obtain the apparatus type information held by said apparatus type information holding unit; and
a stream read permission decision unit operable to search said authorized apparatus type information storage unit for the apparatus type information obtained by said apparatus type information obtaining unit, and to permit said reading unit to read the flag-attached audio data stream from said storage device only when an authorized apparatus type information corresponding to the obtained apparatus type information is present.

26. The data recording and reproduction apparatus according to claim 20, wherein said stream reading unit is constituted by a single apparatus for reproducing a data stream which is separate from said writing unit and said storage unit, and said single apparatus comprises an apparatus type information holding unit operable to hold apparatus type information indicating a type of said single apparatus, and wherein said stream storage unit comprises:
a storage device operable to store the flag-attached audio data stream output from said writing and attaching unit;
an authorized apparatus type information storage unit operable to store authorized apparatus type information indicating stream reproduction apparatuses which are permitted to read the flag-attached audio data stream from said storage device;
an apparatus type information obtaining unit operable to obtain the apparatus type information held by said apparatus type information holding unit; and
a stream read permission decision unit operable to search said authorized apparatus type information storage unit for the apparatus type information obtained by said apparatus type information obtaining unit, and to permit said reading unit to read the flag-attached audio data stream from said storage device only when an authorized apparatus type information corresponding to the obtained apparatus type information is present.

27. The data recording and reproduction apparatus according to claim 23, wherein said stream reading unit is constituted by a single apparatus for reproducing a data stream which is separate from said writing unit and said storage unit, and said single apparatus comprises an apparatus type information holding unit operable to hold apparatus type information indicating a type of said single apparatus, and wherein said stream storage unit comprises:
a storage device operable to store the flag-attached audio data stream output from said writing and attaching unit;
a scramble key storage unit operable to store the scramble key output from said scramble key writing unit;
an authorized apparatus type information storage means operable to store authorized apparatus type information indicating stream reproduction apparatuses which are permitted to read the flag-attached audio data stream from said storage device;
an apparatus type information obtaining unit operable to obtain the apparatus type information held by said apparatus type information holding unit; and
a stream read permission decision unit operable to search said authorized apparatus type information storage means for the apparatus type information obtained by said apparatus type information obtaining unit, and to permit said reading unit to read the flag-attached audio data stream from said storage device only when an authorized apparatus type information corresponding to the obtained apparatus type information is present.

28. The data recording and reproduction apparatus according to claim 23, wherein said stream reading unit is constituted by a single apparatus for reproducing a data stream, and said single apparatus comprises apparatus type information holding means for holding apparatus type information indicating a type of said single apparatus, and wherein said stream storage unit comprises:
- a storage device operable to store the flag-attached audio data stream output from said writing and attaching unit;
- a scramble key storage unit operable to store the scramble key output from said scramble key writing unit;
- an authorized apparatus type information storage unit operable to hold authorized apparatus type information indicating stream reproduction apparatuses which are authorized to read the flag-attached audio data stream from said storage device;
- an apparatus type information obtaining unit operable to obtain the apparatus type information held by said apparatus type information holding unit; and
- a scramble key read permission decision unit operable search the authorized apparatus type information storage unit for the apparatus type information obtained by said apparatus type information obtaining unit, and to permit said scramble key reading unit to read the scramble key from said scramble key storage unit only when an authorized apparatus type information corresponding to the obtained apparatus type information is present.

29. The data recording and reproduction apparatus according to claim 17, wherein said stream storage unit is implemented by an IC card on which a RAM for storing an audio data stream and a CPU for controlling access to the audio data stream stored in said RAM are mounted thereon.

30. The data recording and reproduction apparatus according to claim 25, wherein:
- said stream storage unit is implemented by an IC card on which a RAM for storing an audio data stream and a CPU for controlling access to the audio data stream stored in said RAM are mounted thereon;
- said storage device and said authorized apparatus type information storage unit are implemented by said RAM; and
- said apparatus type information obtaining unit and said stream read permission decision unit are implemented by said CPU.

31. The data recording and reproduction apparatus according to claim 27, wherein:
- said stream storage unit is implemented by an IC card on which a RAM for storing an audio data stream and a CPU for controlling access to the audio data stream stored in said RAM are mounted thereon;
- said storage device, said scramble key storage unit, and said authorized apparatus type information storage unit are implemented by said RAM; and
- said apparatus type information obtaining unit and said stream read permission decision unit are implemented by said CPU.

32. The data recording and reproduction apparatus according to claim 28, wherein:
- said stream storage unit is implemented by an IC card on which a RAM for storing an audio data stream and a CPU for controlling access to the audio data stream stored in said RAM are mounted thereon;
- said storage device, said scramble key storage unit, and said authorized apparatus type information storage unit are implemented by said RAM; and
- said apparatus type information obtaining unit and said scramble key read permission decision unit are implemented by said CPU.

* * * * *

UNITED STATES PATENT AND TRADEMARK OFFICE
CERTIFICATE OF CORRECTION

| | |
|---|---|
| PATENT NO. | : 6,993,133 B1 |
| APPLICATION NO. | : 09/414722 |
| DATED | : January 31, 2006 |
| INVENTOR(S) | : Tomoyuki Nonomura et al. |

It is certified that error appears in the above-identified patent and that said Letters Patent is hereby corrected as shown below:

Claim 17

In column 43, line 16, please add --stream-- after "said" and before "storage".

Signed and Sealed this

Twenty-fifth Day of July, 2006

JON W. DUDAS
*Director of the United States Patent and Trademark Office*